(12) United States Patent
Lee et al.

(10) Patent No.: US 11,568,254 B2
(45) Date of Patent: Jan. 31, 2023

(54) ELECTRONIC APPARATUS AND CONTROL METHOD THEREOF

(71) Applicant: SAMSUNG ELECTRONICS CO., LTD., Suwon-si (KR)

(72) Inventors: Dongsoo Lee, Suwon-si (KR); Sejung Kwon, Suwon-si (KR); Parichay Kapoor, Suwon-si (KR); Byeoungwook Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 503 days.

(21) Appl. No.: 16/727,323

(22) Filed: Dec. 26, 2019

(65) Prior Publication Data
US 2020/0234131 A1 Jul. 23, 2020

(30) Foreign Application Priority Data

Jan. 21, 2019 (KR) .................. 10-2019-0007508

(51) Int. Cl.
*G06N 3/08* (2006.01)
*G06F 17/16* (2006.01)
*G06N 3/04* (2006.01)

(52) U.S. Cl.
CPC ............. *G06N 3/082* (2013.01); *G06F 17/16* (2013.01); *G06N 3/0454* (2013.01)

(58) Field of Classification Search
CPC ... G06F 1/03; G06F 7/58; G06F 7/523; G06F 15/18; G06F 17/16; G06F 17/27;
(Continued)

(56) References Cited

U.S. PATENT DOCUMENTS 10,127,495 B1 * 11/2018 Bopardikar .............. G06N 3/04
10,917,121 B2 2/2021 Lee et al.
(Continued)

FOREIGN PATENT DOCUMENTS

CN 106779068 A 5/2017
CN 107832837 A 3/2018
(Continued)

OTHER PUBLICATIONS

Dongsoo Lee et al., "Viterbi-based Pruning for Sparse Matrix with Fixed and High Index Compression Ratio", ICLR 2018, Apr. 30-May 3, 2018, pp. 1-16, (16 pages total).
(Continued)

*Primary Examiner* — Shawkat M Ali
(74) *Attorney, Agent, or Firm* — Sughrue Mion, PLLC

(57) ABSTRACT

An electronic apparatus is provided. The electronic apparatus includes sample data and memory storing a first matrix included in an artificial intelligence model trained based on sample data, and a processor configured to prunes each of a plurality of first elements included in the first matrix based on a first threshold, and acquire a first pruning index matrix that indicates whether each of the plurality of first elements has been pruned with binary data, factorize the first matrix to a second matrix of which size was determined based on the number of rows and the rank, and a third matrix of which size was determined based on the rank and the number of columns of the first matrix, prunes each of a plurality of second elements included in the second matrix based on a second threshold, and acquire a second pruning index matrix that indicates whether each of the plurality of second elements has been pruned with binary data, prunes each of a plurality of third elements included in the third matrix based on a third threshold, and acquire a third pruning index matrix that indicates whether each of the plurality of third elements
(Continued)

has been pruned with binary data, acquire a final index matrix based on the second pruning index matrix and the third pruning index matrix, and update at least one of the second pruning index matrix or the third pruning index matrix by comparing the final index matrix with the first pruning index matrix.

20 Claims, 18 Drawing Sheets

(58) Field of Classification Search
CPC .. G06N 3/04; G06N 3/06; G06N 3/08; G06N 3/063; G06N 3/082; G06N 3/0454; G06N 20/20; H03M 7/42; H03M 13/00; H03M 13/11; H03M 13/27
USPC ............ 704/240, 257, 260; 706/12, 25
See application file for complete search history.

(56) References Cited

U.S. PATENT DOCUMENTS

| | | | |
|---|---|---|---|
| 2007/0106512 A1 | 5/2007 | Acero et al. | |
| 2012/0109651 A1 | 5/2012 | Chen | |
| 2018/0046915 A1* | 2/2018 | Sun | G06N 3/0445 |
| 2018/0060758 A1* | 3/2018 | Alexandrov | G06N 20/00 |
| 2018/0107926 A1 | 4/2018 | Choi et al. | |
| 2018/0247180 A1 | 8/2018 | Cheng et al. | |
| 2019/0108436 A1* | 4/2019 | David | G06N 3/0454 |
| 2020/0373946 A1 | 11/2020 | Lee et al. | |
| 2021/0111741 A1 | 4/2021 | Lee et al. | |
| 2021/0397962 A1* | 12/2021 | Jeong | G06N 3/04 |

FOREIGN PATENT DOCUMENTS

| | | |
|---|---|---|
| KR | 10-2018-0116226 A | 10/2018 |
| KR | 10-2020-0115239 A | 10/2020 |
| KR | 10-2020-0135117 A | 12/2020 |
| WO | 2018101985 A1 | 6/2018 |

OTHER PUBLICATIONS

Song Han et al., "Deep Compression: Compressing Deep Neural Networks with Pruning, Trained Quantization and Huffman Coding", ICLR 2016, May 2-4, 2016, pp. 1-14 (14 pages total).
Frederick Tung et al., "Deep Neural Network Compression by In-Parallel Pruning-Quantization", IEEE Transactions on Pattern Analysis and Machine Intelligence, Dec. 12, 2018, pp. 1-12 (12 pages total).
International Search Report (PCT/ISA/210) dated Apr. 14, 2020, issued by International Searching Authority in counterpart International Application No. PCT/KR2020/000204.
Written Opinion (PCT/ISA/237) dated Apr. 14, 2020, issued by International Searching Authority in counterpart International Application No. PCT/KR2020/000204.
Wei Jian et al., "Improved Methods for Static Index Pruning", 2016 IEEE International Conference on Big Data (Big Data), Feb. 6, 2017, Total 12 pages.
Yang He et al., "Progressive Deep Neural Networks Acceleration via Soft Filter Pruning", Submitted to IEEE Transactions on Neural Networks and Learning Systems 2018, Aug. 22, 2018, Total 12 pages.
Lee, et al., "Network Pruning for Low-Rank Binary Indexing", 2019, 11 pages total.
Yu, et al., "Scalpel: Customizing DNN Pruning to the Underlying Hardware Parallelism", 2017, ISCA '17, XP 058369127, 13 pages total.
Zhu, et al., "Trained Ternary Quantization", 2017, ICLR, XP 055491016, 10 pages total.
Communication dated Jan. 14, 2022 by the European Patent Office for European Patent Application No. 20745819.1.

\* cited by examiner

FIG. 1A
(PRIOR ART)

$$\begin{pmatrix} 0 & 0 & 0 & 0 \\ 5 & 8 & 0 & 0 \\ 0 & 0 & 3 & 0 \\ 0 & 6 & 0 & 0 \end{pmatrix}$$

FIG. 3B $$\begin{bmatrix} W_{11} & W_{12} & W_{13} & \cdots & W_{1n} \\ W_{21} & & & & W_{2n} \\ W_{31} & & \ddots & & W_{3n} \\ \vdots & & & & \vdots \\ W_{m1} & W_{m2} & W_{m3} & \cdots & W_{mn} \end{bmatrix}$$

FIG. 4C $$\begin{bmatrix} 2.4 & 1.2 & -1.5 & -0.7 \\ -0.4 & 0.6 & -2.2 & 0.9 \\ -0.8 & 1.2 & -1.3 & -0.2 \\ 0.1 & 2.0 & -1.7 & -2.0 \end{bmatrix}$$

FIG. 5

| Rank (K) | Accuracy (%), Song Han's Pruning → 99.21% | | | | Compression Ratio |
|---|---|---|---|---|---|
| | 20K (pruning) | 40K | 50K | 60K | |
| 4 | 33.69 | 98.96 | 99.03 | 99.07 | 76.9 |
| 8 | 34.52 | 98.98 | 99.05 | 99.09 | 38.5 |
| 16 | 30.28 | 99.01 | 99.09 | 99.13 | 19.2 |
| 32 | 32.52 | 99.01 | 99.08 | 99.13 | 9.7 |
| 64 | 36.02 | 99.04 | 99.10 | 99.14 | 4.8 |
| 128 | 34.22 | 99.04 | 99.10 | 99.16 | 2.4 |
| 256 | 42.86 | 99.07 | 99.14 | 99.19 | 1.2 |

FIG. 6A $$\begin{bmatrix} 1 & 0 & 1 & 0 & 0 \\ 1 & 0 & 0 & 1 & 0 \\ 1 & 0 & 0 & 0 & 1 \\ 1 & 1 & 0 & 0 & 0 \\ 0 & 1 & 1 & 0 & 0 \\ 0 & 1 & 0 & 1 & 0 \\ 0 & 1 & 0 & 0 & 1 \\ 0 & 0 & 1 & 1 & 0 \\ 0 & 0 & 0 & 1 & 1 \end{bmatrix} \begin{bmatrix} x \\ x_1 \\ x_2 \\ x_3 \\ x_4 \\ x_5 \end{bmatrix} = \begin{bmatrix} x \\ 1 \\ 0 \\ x \\ 0 \\ 1 \\ x \\ 1 \\ x \end{bmatrix}$$

ELECTRONIC APPARATUS AND CONTROL METHOD THEREOF

CROSS-REFERENCE TO RELATED APPLICATION(S)

This application is based on and claims priority under 35 U.S.C. § 119(a) of a Korean patent application number 10-2019-0007508, filed on Jan. 21, 2019, in the Korean Intellectual Property Office, the disclosure of which is incorporated by reference herein in its entirety.

BACKGROUND

1. Field

The disclosure relates to an artificial intelligence (AI) system that simulates functions of a human brain such as cognition and determination by using a machine learning algorithm such as deep learning and application thereof, and more particularly, to an electronic apparatus for compressing an AI model and a control method thereof.

2. Description of Related Art

Recently, artificial intelligence systems implementing intelligence of a human level are used in various fields. An artificial intelligence system refers to a system wherein a machine learns, determines, and becomes smarter by itself, unlike conventional rule-based smart systems. An artificial intelligence system shows a more improved recognition rate as it is used more, and becomes capable of understanding user preference more correctly. For this reason, conventional rule-based smart systems are gradually being replaced by deep learning-based artificial intelligence systems.

An artificial intelligence technology consists of machine learning (for example, deep learning) and element technologies utilizing machine learning.

Machine learning refers to an algorithm technology of classifying/learning the characteristics of input data by itself, and an element technology refers to a technology of simulating functions of a human brain such as cognition and determination by using a machine learning algorithm such as deep learning, and includes fields of technologies such as linguistic understanding, visual understanding, inference/prediction, knowledge representation, and operation control.

Examples of various fields to which artificial intelligence technologies are applied are as follows. Linguistic understanding refers to a technology of recognizing languages/characters of humans, and applying/processing them, and includes natural speech processing, machine translation, communication systems, queries and answers, voice recognition/synthesis, and the like. Visual understanding refers to a technology of recognizing an object in a similar manner to human vision, and processing the object, and includes recognition of an object, tracking of an object, search of an image, recognition of humans, understanding of a scene, understanding of a space, improvement of an image, and the like. Inference/prediction refers to a technology of determining information and then making logical inference and prediction, and includes knowledge/probability based inference, optimization prediction, preference based planning, recommendation, and the like. Knowledge representation refers to a technology of automatically processing information of human experiences into knowledge data, and includes knowledge construction (data generation/classification), knowledge management (data utilization), and the like. Operation control refers to a technology of controlling autonomous driving of vehicles and movements of robots, and includes movement control (navigation, collision, driving), operation control (behavior control), and the like.

Recently, technologies of compressing deep learning models without degradation in performance are gaining much spotlight. In the case of compressing a deep learning model effectively without degradation in performance, the cost for manufacturing a device can be reduced, and the speed of performing deep learning is improved, and thus it becomes possible to use deep learning in mobile devices.

Among the conventional methods of compression, a representative method is a method of pruning weights which are equal to or smaller than a specific value based on the sizes of weight values, and retraining a deep learning model by using the remaining weights, and thereby restoring the accuracy of deep learning. When pruning and retraining processes are repeated, most values become 0, and by removing the values, the size of a matrix can be reduced.

For example, if a weight matrix as in FIG. 1A is assumed, the matrix may be changed into a sparse matrix format as in FIG. 1B, for removing 0.

Meanwhile, A stores only non-zero values, and IA accumulates the number of non-zero weights corresponding to the respective rows of the matrix, excluding 0 which it basically has at first. Lastly, JA stores column indices which correspond to the respective non-zero values of A. That is, by using A and IA, and JA, the magnitude and position information of values which are not 0 are stored. A sparse matrix consisting of A, IA, and JA is referred to as a compressed sparse row (CSR) format.

The non-zero values which remain after pruning are put through a process of quantization, and after pruning, the amount of quantized information is reduced, and also, the distribution rate of the values is reduced. Distribution rate may refer to the number of uniquely different weight values. Thus, pruning and quantization are used together in most cases.

However, there is a problem that in a CSR format, the amount of an index is always bigger than the magnitude of a non-zero weight corresponding to A. That is, the amount of index data is larger than that of the amount of non-zero weight data. Accordingly, there is a problem that the compression rate of an index should be improved. Also, in the case of constituting the original matrix by using a CSR format, there is a problem that the manner of reading a CSR format itself is not appropriate for parallel computing.

In addition, recently, methods of expressing 3 kinds of states of each weight by using 2 bits are gaining popularity. For example, ternary quantization is a representative example, and in the case of 00 or 01, the data thereof is a masked value (i.e., a weight which becomes 0), and if the first bit is 1, the second bit expresses a quantized value. In this case, weights always have 2 bits regardless of the pruning rate, and thus a high pruning rate is not effectively used. This is because, in the case of constituting a sparse matrix by erasing a pruned value, there is a problem that data access and processing becomes complex.

Accordingly, a compression method by which compression can be decompressed in parallel while the pruning rate is as high as in a conventional method, and an effective algorithm and hardware decompressing compression are needed.

SUMMARY

The disclosure is for addressing the aforementioned need. Accordingly, the disclosure is aimed at providing an electronic apparatus that compresses an artificial intelligence model to be appropriate for parallel computing while reducing data capacity, and a control method thereof.

An electronic apparatus according to an embodiment of the disclosure for achieving the aforementioned purpose includes a memory configured to store a first matrix, wherein the first matrix is included in an artificial intelligence model, wherein the artificial intelligence model is trained based on sample data; and a processor configured to: prune each of a plurality of first elements included in the first matrix based on a first threshold, acquire a first pruning index matrix, wherein the first pruning index matrix indicates for each element of the plurality of first elements, whether each element of the plurality of first elements has been pruned, factorize the first matrix to a second matrix and a third matrix, wherein a size of the second matrix is determined based on a number of rows of the first matrix and a rank, wherein a size of the third matrix is determined based on the rank and a number of columns of the first matrix, prune, based on a second threshold, each of a plurality of second elements included in the second matrix, acquire a second pruning index matrix, wherein the second pruning index matrix indicates for each element of the plurality of second elements, whether each element of the plurality of second elements has been pruned, prune, based on a third threshold, each of a plurality of third elements included in the third matrix, acquire a third pruning index matrix, wherein the third pruning index matrix indicates for each element of the plurality of third elements, whether each element of the plurality of third elements has been pruned, acquire a final index matrix based on the second pruning index matrix and the third pruning index matrix, and update at least one of the second pruning index matrix or the third pruning index matrix by comparing the final index matrix with the first pruning index matrix.

In some embodiments, the processor of the electronic apparatus is further configured to: compare elements included in the final index matrix with elements in corresponding positions included in the first pruning index matrix, identify positions at which the elements included in the final index matrix do not match the elements in corresponding positions included in the first pruning index matrix, and update at least one of the second pruning index matrix or the third pruning index matrix, wherein the processor is configured to perform the update by changing, based on the sizes of elements of the first matrix corresponding to the identified positions, at least one of the second threshold or the third threshold.

In some embodiments, the processor of the electronic apparatus is further configured to: based on identifying a plurality of positions at which the elements included in the final index matrix do not match the elements in corresponding positions included in the first pruning index matrix, sum the sizes of a plurality of elements of the first matrix corresponding to the plurality of identified positions, and based on the summed size being equal to or greater than a threshold size, change at least one of the second threshold or the third threshold.

In some embodiments, the processor of the electronic apparatus is further configured to: based on one of the second threshold or the third threshold being increased, decrease the other one of the second threshold or the third threshold, and based on one of the second threshold or the third threshold being decreased, increase the other one of the second threshold or the third threshold.

In some embodiments, the processor of the electronic apparatus is further configured to: ternary quantize each of the plurality of first elements and acquire a quantization matrix including a representative value matrix and first binary data, acquire a random matrix, wherein a size of the random matrix is based on a compression subject unit and a compression target unit of the first binary data, acquire a plurality of equations based on the random matrix and the compression subject unit, and remove at least some of the plurality of equations based on binary data corresponding to the pruned first element among a plurality of binary data corresponding to the compression subject unit, and acquire second binary data corresponding to the compression target unit based on remaining equations of the plurality of equations.

In some embodiments, the processor of the electronic apparatus is further configured to: based on a number of the remaining equations exceeding a number of unknowns included in the compression target unit, identify, among the remaining equations based on dependency among the remaining equations, a plurality of first equations corresponding to the number of unknowns, and acquire third binary data corresponding to the compression target unit based on the plurality of first equations.

In some embodiments, the processor of the electronic apparatus is further configured to: identify whether at least one second equation excluding the plurality of first equations is established based on the third binary data, and generate patch information corresponding to third equations that are not established, wherein the plurality of equations includes the third equations, wherein the patch information includes information on the number of the third equations and identification information of each of the third equations that are not established.

In some embodiments, the processor of the electronic apparatus is further configured to: ternary quantize each of a plurality of first elements that were not pruned in the first matrix, and acquire the quantization matrix including the representative value matrix and the first binary data.

In some embodiments, the processor of the electronic apparatus is further configured to: identify the plurality of first elements that were not pruned in the first matrix based on the final index matrix.

In some embodiments of the electronic apparatus the random matrix includes elements of a first type and elements of a second type, and a number of the elements of the first type included in the random matrix and a number of the elements of the second type included in the random matrix are identical to each other.

Also provided herein is a control method of an electronic apparatus storing a first matrix included in an artificial intelligence model trained based on sample data, the control method including: pruning each of a plurality of first elements included in the first matrix based on a first threshold, and acquiring a first pruning index matrix, wherein the first pruning index matrix indicates for each element of the plurality of first elements, whether each element of the plurality of first elements; factorizing the first matrix to a second matrix and a third matrix, wherein a size of the second matrix is determined based on a number of rows of the first matrix and a rank, wherein a size of the third matrix is determined based on the rank and a number of columns of the first matrix; pruning, based on a second threshold, each of a plurality of second elements included in the second matrix; acquiring a second pruning index matrix, wherein the second pruning index matrix indicates for each element of the plurality of second elements, whether each element of the plurality of second elements has been pruned; pruning, based on a third threshold, each of a plurality of third elements included in the third matrix; acquiring a third pruning index matrix, wherein the third pruning index matrix indicates for each element of the plurality of third elements, whether each element of the plurality of third elements has been pruned; acquiring a final index matrix based on the second pruning index matrix and the third pruning index matrix; and updating at least one of the second pruning index matrix or the third pruning index matrix by comparing the final index matrix with the first pruning index matrix.

In some embodiments of the control method, the updating includes: comparing elements included in the final index matrix with elements in corresponding positions included in the first pruning index matrix and identifying positions at which the elements included in the final index matrix do not match the elements in corresponding positions included in the first pruning index matrix; and updating at least one of the second pruning index matrix or the third pruning index matrix by changing, based on sizes of elements of the first matrix corresponding to the identified positions, at least one of the second threshold or the third threshold.

In some embodiments of the control method, the updating includes, based on identifying a plurality of positions at which the elements included in the final index matrix do not match the elements in corresponding positions included in the first pruning index matrix, summing the sizes of a plurality of elements of the first matrix corresponding to the plurality of identified positions; and based on the summed size being equal to or greater than a threshold size, changing at least one of the second threshold or the third threshold.

In some embodiments of the control method, the updating includes, based on one of the second threshold or the third threshold being increased, decreasing the other one of the second threshold or the third threshold; and based on one of the second threshold or the third threshold being decreased, increasing the other one of the second threshold or the third threshold.

In some embodiments, the control method includes ternary quantizing each of the plurality of first elements and acquiring a quantization matrix including a representative value matrix and first binary data; acquiring a random matrix, wherein a size of the random matrix is based on a compression subject unit and a compression target unit of the first binary data; acquiring a plurality of equations based on the random matrix and the compression subject unit; removing at least some of the plurality of equations based on binary data corresponding to the pruned first element among a plurality of binary data corresponding to the compression subject unit; and acquiring second binary data corresponding to the compression target unit based on remaining equations of the plurality of equations.

In some embodiments of the control method, the acquiring second binary data corresponding to the compression target unit includes, based on a number of the remaining equations exceeding a number of unknowns included in the compression target unit, identifying, among the remaining equations based on dependency among the remaining equations, a plurality of first equations corresponding to the number of unknowns; and acquiring third binary data corresponding to the compression target unit based on the plurality of first equations.

In some embodiments of the control method, the acquiring third binary data corresponding to the compression target unit further includes: identifying whether at least one second equation excluding the plurality of first equations is established based on the third binary data; and generating patch information corresponding to third equations that are not established, wherein the plurality of equations includes the third equations, wherein the patch information includes information on the number of the third equations and identification information of each of the third equations that are not established.

In some embodiments of the control method, the acquiring the quantization matrix comprises: ternary quantizing each of a plurality of first elements that were not pruned in the first matrix, and acquiring the quantization matrix including the representative value matrix and binary data.

In some embodiments of the control method, the acquiring the quantization matrix comprises: identifying the plurality of first elements that were not pruned in the first matrix based on the final index matrix.

In some embodiments of the control method, the random matrix includes elements of a first type and elements of a second type, and a number of the elements of the first type included in the random matrix and a number of the elements of the second type included in the random matrix are identical to each other.

According to various embodiment of the disclosure as described above, an electronic apparatus is capable of overcoming constraints according to hardware performance by compressing an artificial intelligence model so that parallel computer processing is possible, and improving the processing rate.

BRIEF DESCRIPTION OF THE DRAWINGS

Figure 1B:
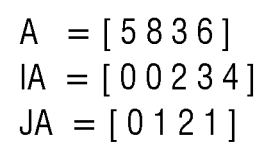

FIG. 1A is a diagram for resolving the problem of a conventional technology;

FIG. 1B is a diagram for resolving the problem of a conventional technology;

FIG. 3B is a diagram for illustrating a method of processing a matrix included in an artificial intelligence model for promoting understanding of the disclosure;

FIG. 4C is a diagram for illustrating a method of compressing a first pruning index matrix according to an embodiment of the disclosure;

FIG. 5 is a diagram for illustrating compression performance and accuracy according to an embodiment of the disclosure;

FIG. 6A is a diagram for illustrating a method of compressing a quantization matrix according to an embodiment of the disclosure;

FIG. 6B is a diagram for illustrating a method of compressing a quantization matrix according to an embodiment of the disclosure;

DETAILED DESCRIPTION

Figure 2A:
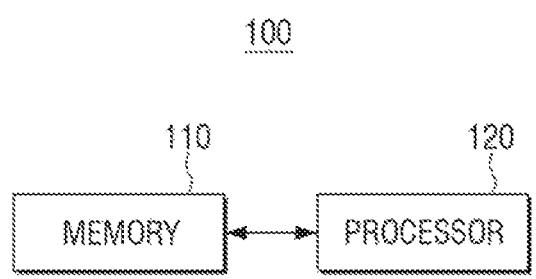
FIG. 2A is a block diagram illustrating a configuration of an electronic apparatus according to an embodiment of the disclosure.

The exemplary embodiments of the present disclosure may be diversely modified. Accordingly, specific exemplary embodiments are illustrated in the drawings and are described in detail in the detailed description. However, it is to be understood that the present disclosure is not limited to a specific exemplary embodiment, but includes all modifications, equivalents, and substitutions without departing from the scope and spirit of the present disclosure. Also, well-known functions or constructions are not described in detail since they would obscure the disclosure with unnecessary detail.

Hereinafter, the disclosure will be described in detail with reference to the accompanying drawings.

As terms used in the embodiments of the disclosure, general terms that are currently used widely were selected as far as possible, in consideration of the functions described in the disclosure. However, the terms may vary depending on the intention of those skilled in the art who work in the pertinent field, previous court decisions or emergence of new technologies. Also, in particular cases, there may be terms that were designated by the applicant on his own, and in such cases, the meaning of the terms will be described in detail in the relevant descriptions in the disclosure. Thus, the terms used in the disclosure should be defined based on the meaning of the terms and the overall content of the disclosure, but not just based on the names of the terms.

In this specification, terms such as "have," "may have," "include" or "may include" should be construed as denoting that there are such characteristics (e.g., elements such as numerical values, functions, operations or components), and the terms are not intended to exclude the existence of additional characteristics.

Also, the expression "at least one of A and/or B" should be interpreted to mean any one of "A" or "B" or "A and B."

Further, the expressions "first," "second" and the like used in this specification may be used to describe various elements regardless of any order and/or degree of importance. Also, such expressions are used only to distinguish one element from another element, and are not intended to limit the elements.

In addition, the description in the disclosure that one element (e.g., a first element) is "(operatively or communicatively) coupled with/to" or "connected to" another element (e.g., a second element) should be interpreted to include both the case where the one element is directly coupled to the another element, and the case where the one element is coupled to the another element through still another element (e.g., a third element).

Meanwhile, singular expressions may include plural expressions, unless defined obviously differently in the context. Also, in this specification, terms such as "include" or "consist of" should be construed as designating that there are such characteristics, numbers, operations, elements, components or a combination thereof in the specification, but not to exclude the existence or possibility of adding one or more of other characteristics, numbers, operations, elements, components or a combination thereof.

In addition, the terms "a module" or "a part" used in the disclosure are for referring to elements performing at least one function or operation, and these elements may be implemented as hardware or software, or as a combination of hardware and software. Further, a plurality of "modules" or "parts" may be integrated into at least one module and implemented as at least one processor (not shown), except "modules" or "parts" that need to be implemented as specific hardware.

Also, in this specification, the term "user" may refer to a person who uses an electronic apparatus, or an apparatus using an electronic apparatus (e.g., an artificial intelligence electronic apparatus).

Hereinafter, an embodiment of the disclosure will be described in more detail with reference to the accompanying drawings.

FIG. 2A is a block diagram illustrating a configuration of an electronic apparatus 100 according to an embodiment of the disclosure. As illustrated in FIG. 2A, the electronic apparatus 100 includes memory 110 and a processor 120.

The electronic apparatus 100 may be an apparatus compressing an artificial intelligence model. For example, the electronic apparatus 100 is an apparatus that compresses a matrix included in an artificial intelligence model, and it may be a server, a desktop PC, a laptop computer, a smartphone, a tablet PC, etc. Also, an artificial intelligence model may include a plurality of matrices, and the electronic apparatus 100 may compress the entire plurality of matrices. That is, any electronic apparatus that is capable of reducing the size of data of an artificial intelligence model by compressing the artificial intelligence model may be the electronic apparatus 100. Here, a matrix may be a weight matrix.

Also, the electronic apparatus 100 may prune an artificial intelligence model. Pruning is a method of removing a redundant weight. To be specific, it is a method of changing the numerical value of a specific element (a specific deep learning parameter) in a matrix included in an artificial intelligence model to 0. For example, the electronic apparatus 100 may prune a matrix in a m×n size, by a method of changing elements that are equal to or smaller than a preset value among a plurality of elements included in the matrix in a m×n size included in an artificial intelligence model.

In addition, the electronic apparatus 100 may acquire a pruning index (pruning masking) according to pruning. A pruning index indicates whether each of a plurality of elements (parameters) included in a matrix is pruned with 0 or 1. That is, if a matrix in a m×n size is pruned, a pruning index in a m×n size may be generated in the form of a matrix, and the pruning index in a m×n size may include the position of an element which was converted to 0 among a plurality of elements included in the matrix in a m×n size as 0, and the position of an element which was not converted to 0 among a plurality of elements included in the matrix in a m×n size as 1.

However, the disclosure is not limited thereto, and 0 and 1 may have opposite meaning to the above, or whether pruning was performed may be expressed with other values excluding 0 and 1. Also, which element was pruned may be expressed with x and y coordinates.

As a pruning index is in the form of a matrix, it will be described as a pruning index matrix below.

Meanwhile, the electronic apparatus 100 may perform factorization and quantization on an artificial intelligence model. Factorization is a method of dividing a matrix in a m×n size into two matrices having a rank r, and quantization is a method of converting a weight to a representative value.

The memory 110 is provided separately from the processor 120, and it may be implemented as a hard disk, non-volatile memory, volatile memory, etc.

The memory 110 may store a first matrix included in an artificial intelligence model trained based on sample data. Here, the first matrix may be filter data, kernel data, etc. constituting an artificial intelligence model. Also, the memory 110 may store a plurality of matrices included in an artificial intelligence model.

Alternatively, the memory 110 may store data that can be used in an artificial intelligence model, and the processor 120 may identify data stored in the memory 110 as a first matrix.

The processor 120 controls the overall operations of the electronic apparatus 100.

According to an embodiment of the disclosure, the processor 120 may be implemented as a digital signal processor (DSP), a microprocessor, a time controller (TCON), and the like. However, the disclosure is not limited thereto, and the forms of implementation may include one or more of a central processing unit (CPU), a micro controller unit (MCU), a micro processing unit (MPU), a controller, an application processor (AP) or a communication processor (CP), and an ARM processor, or may be defined by these terms. Also, the processor 120 may be implemented as a system on chip (SoC), or a large scale integration (LSI) having a processing algorithm embedded therein, or may be implemented in the form of a field programmable gate array (FPGA).

In addition, the processor 120 may acquire a first pruning index matrix that prunes each of a plurality of first elements included in the first matrix stored in the memory 110 based on a first threshold, and indicates whether each of the plurality of first elements has been pruned with binary data.

For example, the processor 120 may perform pruning by a method of converting elements of which size is equal to or smaller than 3 among 1000 first elements included in a first matrix in a 100×10 size to 0, and maintaining the remaining elements as they are. Also, the processor 120 may acquire a first pruning index matrix which indicates pruned elements among the 1000 first elements as 0, and elements that were not pruned as 1. That is, the first pruning index matrix may be in the form of a 100×10 size which is identical to the size of the first matrix, and may include only 0 or 1.

The first pruning index matrix falls under a case where ideal pruning has been performed. To be more specific, a first element included in a first matrix may have a higher degree of importance as its size is bigger, and the first pruning index matrix indicates a result of pruning by reflecting the size of each of a plurality of first elements included in the first matrix, and thus it can be deemed as ideal. However, a second pruning index matrix and a third pruning index matrix that will be described later are not capable of reflecting the size of each of a plurality of first elements included in the first matrix as they have gone through a factorization process, and thus they cannot be deemed as ideal. A method for complementing this will be described later.

Meanwhile, the processor 120 may factorize a first matrix to a second matrix of which size was determined based on the number of rows and the rank, and a third matrix of which size was determined based on the rank and the number of columns of the first matrix.

For example, the processor 120 may factorize a matrix in a 100×10 size to a second matrix in a 100×3 size and a third matrix in a 3×10 size. In this case, the rank is 3, and as the rank becomes smaller, the compression rate becomes more improved. However, the first matrix is not restored even if the second matrix and the third matrix are multiplied, and an error occurs.

Meanwhile, a factorization method may be non-negative matrix factorization (NMF), but the method is not limited thereto, and various methods can obviously be used. As factorization methods are conventional technologies, a detailed description of the methods will be omitted.

Further, the processor 120 may acquire a second pruning index matrix that prunes each of a plurality of second elements included in the second matrix based on a second threshold, and indicates whether each of the plurality of second elements has been pruned with binary data, and a third pruning index matrix that prunes each of a plurality of third elements included in the third matrix based on a third threshold, and indicates whether each of the plurality of third elements has been pruned with binary data.

That is, the processor 120 may acquire a second pruning index matrix and a third pruning index matrix by the same method, independently from the first pruning index matrix. However, the processor 120 may apply thresholds for pruning differently.

In the aforementioned embodiment, the second pruning index matrix may be in the form of a 100×3 size which is identical to the size of the second matrix, and may include only 0 or 1. Also, the third pruning index matrix may be in the form of 3×10 size which is identical to the size of the third matrix, and may include only 0 or 1.

Accordingly, the first pruning index matrix may be compressed as much as the second pruning index matrix and the third pruning index matrix. In the aforementioned embodiment, the first pruning index matrix is in a size of 100×10=1000 bits, the second pruning index matrix is in a size of 100×3=300 bits, and the third pruning index matrix is in a size of 3×10=30 bits. That is, the first pruning index matrix having 1000 bits may be compressed as 300+30=330 bits.

Thus, an apparatus which is going to use an artificial intelligence model may store a second pruning index matrix and a third pruning index matrix in memory, and restore a matrix corresponding to a first pruning index matrix from the second pruning index matrix and the third pruning index matrix, and perform an operation using an artificial intelligence model.

However, a matrix restored from the second pruning index matrix and the third pruning index matrix may be different from the first pruning index matrix, and the accuracy of the operation may become low. The reason that the accuracy of the operation becomes low is that factorization was performed in the process of acquiring the second pruning index matrix and the third pruning index matrix. That is, a matrix restored from the second pruning index matrix and the third pruning index matrix includes a result of pruning that does not reflect the size of each of a plurality of first elements included in the first matrix, and thus the accuracy of the operation becomes low.

Accordingly, there is a need to acquire a second pruning index matrix and a third pruning index matrix that reflect the size of each of a plurality of first elements included in the first matrix.

For this, the processor 120 may acquire a final index matrix based on the second pruning index matrix and the third pruning index matrix. To be more specific, the processor 120 may perform matrix multiplication by using the second pruning index matrix and the third pruning index matrix. Meanwhile, the processor 120 may perform an addition operation as a XOR operation in the process of matrix multiplication. That is, the processor 120 may perform an operation as 1+1=0, and the other operations may be identical to a matrix operation.

According to the aforementioned embodiment, a final index matrix may be in the form of a 100×10 size which is identical to the size of the first pruning index matrix, and due to the XOR operation, the final index matrix may include only 0 or 1. However, as described above, the final index matrix went through a factorization process, and thus it is highly likely that the final index matrix is not identical to the first pruning index matrix. That is, the final index matrix may include a result of pruning that does not reflect the size of each of a plurality of first elements included in the first matrix, and in the case of using the final index matrix, accuracy of an operation may become low.

Afterwards, the processor 120 may compare the final index matrix with the first pruning index matrix, and update at least one of the second pruning index matrix or the third pruning index matrix.

To be specific, the processor 120 may compare each of the binary data included in the final index matrix with binary data in corresponding positions included in the first pruning index matrix and identify positions including different data. Then, the processor 120 may change at least one of the second threshold or the third threshold based on the size of an element of the first matrix corresponding to the identified position, and update at least one of the second pruning index matrix or the third pruning index matrix.

In particular, the processor 120 may, based on identifying a plurality of positions having different data, sum the sizes of a plurality of elements of the first matrix corresponding to the plurality of identified positions, and if the summed size is equal to or greater than a threshold size, change at least one of the second threshold or the third threshold. In some embodiments, the size of an element is the absolute value of the element and a sum of sizes corresponds to a sum of absolute values of matrix elements. This is a process of identifying whether an important element has been removed by pruning in the initial first matrix, and the greater the summed size is, the more likely an important element has been removed by factorization and pruning. Accordingly, the processor 120 repeats the process of, if the summed size is equal to or greater than a threshold size, changing at least one of the second threshold or the third threshold, and updating the second pruning index matrix and the third pruning index matrix based on the changed second threshold and the changed third threshold.

Here, the processor may, if one of the second threshold or the third threshold is increased, decrease the other one of the second threshold or the third threshold, and if one of the second threshold or the third threshold is decreased, increase the other one of the second threshold or the third threshold.

Also, the processor 120 may, if at least one of the second pruning index matrix and the third pruning index matrix is updated, reacquire a final index matrix, and compare the reacquired final index matrix with the first pruning index matrix, and thereby identify a position having different data.

Then, if a plurality of positions having different data are identified, the processor 120 may sum the sizes of a plurality of elements of the first matrix corresponding to the plurality of identified positions, and identify whether the summed size is equal to or greater than a threshold size. The processor 120 may repeat the above process until the summed size becomes smaller than a threshold size. When the summed size becomes smaller than a threshold size, the operation result of an artificial intelligence model including a second pruning index matrix and a third pruning index matrix that have been finally updated would not become so much different from the operation result of an artificial intelligence model including the first pruning index matrix. In other words, accuracy of an operation can be maintained. Also, the first pruning index matrix may be compressed to a second pruning index matrix and a third pruning index matrix that have been finally updated.

Accuracy of an operation can be maintained through a method as described above, and the capacity of data of a pruning index matrix generated during a pruning process may be compressed.

Meanwhile, the processor 120 may ternary quantize each of a plurality of first elements, and thereby acquire a quantization matrix including a representative value matrix and binary data. As a method of ternary quantization is a conventional technology, a detailed description of the method will be omitted.

Alternatively, the processor 120 may ternary quantize each of a plurality of first elements that have not been pruned, and thereby acquire a quantization matrix including a representative value matrix and binary data. Here, the processor 120 may identify whether pruning has been performed based on one of the first pruning index matrix and the final index matrix.

Meanwhile, each element included in a quantization matrix may be 1 bit, or exceed 1 bit. However, even if each element included in a quantization matrix exceeds 1 bit, a compression method for a case where each element included in a quantization matrix is 1 bit may be applied as it is. For example, if each element included in a quantization matrix is 2 bits, the quantization matrix may be divided into two matrices having the same size based on digits, and elements included in each of the two matrices may be 1 bit. Also, a compression method for a case where each element included in a quantization matrix is 1 bit may be applied to each of the two matrices as it is. Accordingly, hereinafter, a compression method will be explained based on the assumption that each element included in a quantization matrix is 1 bit.

The processor 120 may acquire a random matrix of which size was determined based on a compression subject unit and a compression target unit of binary data included in a quantization matrix. For example, the processor 120 may acquire a random matrix in a 7×3 size based on 7 bits which is a compression subject unit and 3 bits which is a compression target unit of binary data included in a quantization matrix. The processor 120 may compress other matrices included in the artificial intelligence model using the acquired random matrix.

Here, a compression subject unit means the number of bits to be compressed at once in binary data included in a quantization matrix, and a compression target unit indicates in how many bits a compression subject unit will be compressed. In the aforementioned embodiment, 7 bits are compressed to 3 bits, and if there are 70 bits in total in a quantization matrix, the quantization matrix may be ultimately compressed to 30 bits. Accordingly, a quantization matrix can be compressed only when a compression target unit is set to be smaller than a compression subject unit.

Also, a random matrix includes elements of a first type and elements of a second type, and the number of the elements of the first type included in the random matrix and the number of the elements of the second type included in the random matrix may be identical to each other. For example, a random matrix may include 0 and 1, and the number of 0 and the number of 1 may be identical. However, the disclosure is not limited thereto, and in case the number of elements included in a random matrix is an odd number, the difference between the number of 0 and the number of 1 may be 1.

The processor 120 may acquire a plurality of equations based on the random matrix and the compression subject unit, and remove at least some of the plurality of equations based on binary data corresponding to the pruned first element among a plurality of binary data corresponding to the compression subject unit, and acquire binary data corresponding to the compression target unit based on the remaining equations.

For example, the processor may 120 acquire a plurality of equations such that multiplication of a random matrix and a compression target unit becomes a compression subject unit, and remove an equation including a pruned first element among a plurality of first elements corresponding to the compression subject unit. A pruned first element is meaningless whatever value it has, and thus it is not worth being used as an equation. The processor 120 may acquire binary data corresponding to the compression target unit based on the remaining equations.

Then, the processor may, if the number of the remaining equations exceeds the number of unknowns included in the compression target unit, identify a plurality of first equations corresponding to the number of unknowns among the remaining equations based on dependency among the remaining equations, and acquire binary data corresponding to the compression target unit based on the plurality of first equations.

Here, the processor 120 may identify whether at least one second equation excluding the plurality of first equations among the remaining equations is established based on the acquired binary data corresponding to the compression target unit, and generate patch information corresponding to third equations that are not established among the at least one second equation. In some embodiments, an equation is established when a solution is found that satisfies the equation.

Here, the patch information may include information on the number of the third equations that are not established and identification information of each of the third equations that are not established.

Meanwhile, the processor 120 may ternary quantize each of a plurality of first elements that were not pruned in the first matrix, and acquire a quantization matrix including the representative value matrix and binary data.

Here, the processor 120 may identify a plurality of first elements that were not pruned in the first matrix based on the final index matrix. However, the disclosure is not limited thereto, and the processor 120 may also identify a plurality of first elements that were not pruned in the first matrix based on the first pruning index matrix.

By a method as described above, the processor 120 may compress a quantization matrix. Afterwards, in the case of restoring an artificial intelligence model, the processor 120 may restore a compressed quantization matrix to a quantization matrix based on a random matrix. Also, in the restoration process, the processor 120 may convert some binary data by using patch information.

Figure 2B:
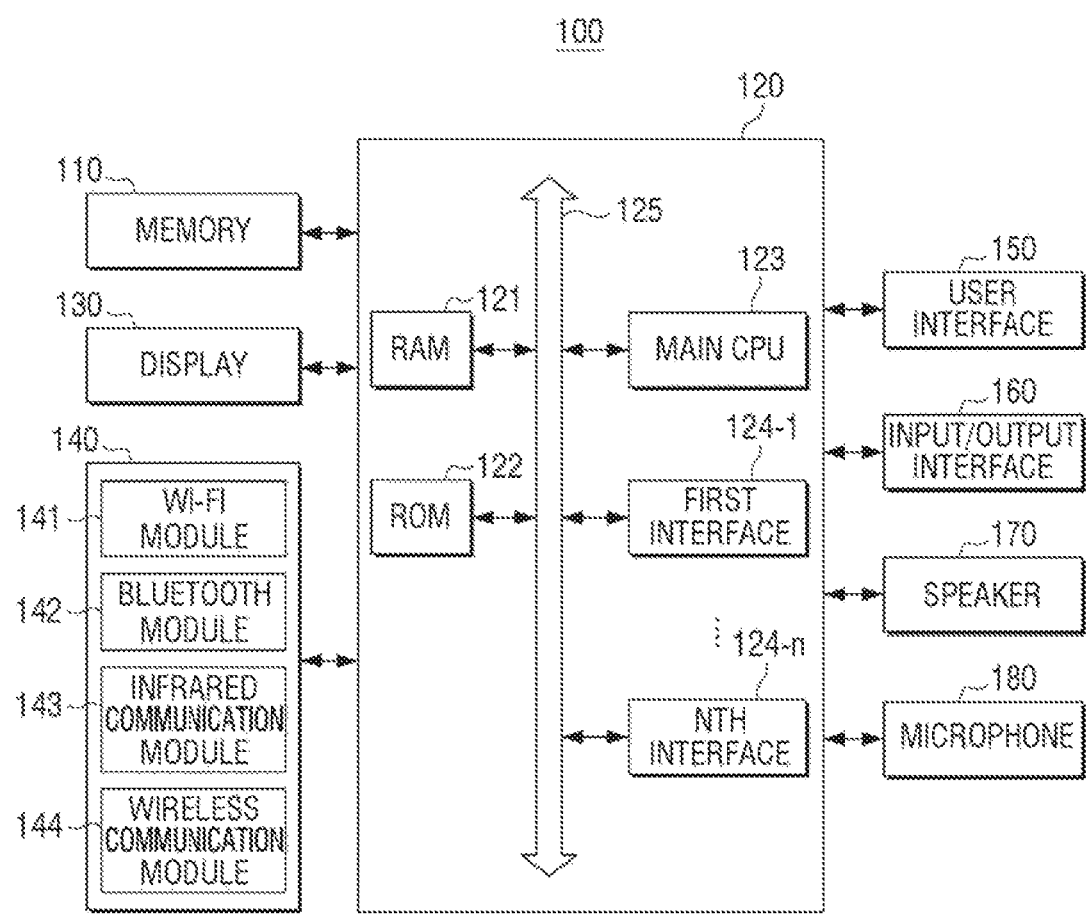
FIG. 2B is a block diagram illustrating a detailed configuration of an electronic apparatus according to an embodiment of the disclosure.

FIG. 2B is a block diagram illustrating a detailed configuration of an electronic apparatus 100 according to an embodiment of the disclosure. The electronic apparatus 100 may include memory 110 and a processor 120. Also, according to FIG. 2B, the electronic apparatus 100 may further include a display 130, a communication interface 140, a user interface 150, an input/output interface 160, a speaker 170, and a microphone 180. Among the components illustrated in FIG. 2B, regarding the components that overlap with those illustrated in FIG. 2A, a detailed description will be omitted.

The memory 110 may be implemented as internal memory such as ROM (e.g., electrically erasable programmable read-only memory (EEPROM)), RAM, etc. included in the processor 120, or memory separate from the processor 120. In this case, the memory 110 may be implemented in the form of memory embedded in the electronic apparatus 100, or in the form of memory that can be attached to or detached from the electronic apparatus 100, according to the usage of stored data. For example, in the case of data for operating the electronic apparatus 100, the data may be stored in memory embedded in the electronic apparatus 100, and in the case of data for the extending function of the electronic apparatus 100, the data may be stored in memory that can be attached to or detached from the electronic apparatus 100. Meanwhile, in the case of memory embedded in the electronic apparatus 100, the memory may be implemented as at least one of volatile memory (e.g., dynamic RAM (DRAM), static RAM (SRAM), or synchronous dynamic RAM (SDRAM), etc.) or non-volatile memory (e.g., one time programmable ROM (OTPROM), programmable ROM (PROM), erasable and programmable ROM (EPROM), electrically erasable and programmable ROM (EEPROM), mask ROM, flash ROM, flash memory (e.g., NAND flash or NOR flash, etc.), a hard drive or a solid state drive (SSD)). In the case of memory that can be attached to or detached from the electronic apparatus 100, the memory may be implemented in a form such as a memory card (e.g., compact flash (CF), secure digital (SD), micro secure digital (Micro-SD), mini secure digital (Mini-SD), extreme digital (xD), a multi-media card (MMC), etc.) and external memory that can be connected to a USB port (e.g., USB memory), etc.

The memory 110 stores various types of data, such as an operating system (O/S) software module for driving the electronic apparatus 100, an artificial intelligence model module, and a compression module.

The processor 120 controls the overall operations of the electronic apparatus 100 by using various types of programs stored in the memory 110.

To be specific, the processor 120 includes a RAM 121, a ROM 122, a main CPU 123, $1^{st}$ to $n^{th}$ interfaces (124-1 to 124-n), and a bus 125.

The RAM 121, the ROM 122, the main CPU 123, the $1^{st}$ to $n^{th}$ interfaces (124-1~124-n), etc. may be connected to one another through the bus 125.

In the ROM 122, an instruction set for system booting, and the like are stored. When a turn-on instruction is input and power is supplied, the main CPU 123 copies the O/S stored in the memory 110 in the RAM 121 according to the instruction stored in the ROM 122, and boots the system by executing the O/S. When booting is completed, the main CPU 123 copies various application programs stored in the memory 110 in the RAM 121, and performs various operations by executing the application programs copied in the RAM 121.

The main CPU 123 accesses the memory 110, and performs booting using the O/S stored in the memory 110. Also, the main CPU 123 performs various operations by using various programs, content data, etc. stored in the memory 110.

The $1^{st}$ to $n^{th}$ interfaces (124-1 to 124-n) are connected with the aforementioned various components. One of the interfaces may be a network interface that is connected to an external apparatus through a network.

Meanwhile, the processor 120 may perform a graphic processing function (a video processing function). For example, the processor 120 may generate a screen including various objects such as icons, images, and texts by using an operation unit (not shown) and a renderer (not shown). Here, the operation unit (not shown) may operate attribute values such as coordinate values, shapes, sizes, and colors by which each object will be displayed according to the layout of the screen, based on the received control instruction. Also, the renderer (not shown) may generate screens in various layouts including objects, based on the attribute values operated at the operation unit (not shown). Further, the processor 120 may perform various types of image processing such as decoding, scaling, noise filtering, frame rate conversion, resolution conversion, and the like of video data.

Meanwhile, the processor 120 may perform processing of audio data. To be specific, the processor 120 may perform various types of processing such as decoding or amplification, noise filtering, and the like of audio data.

The display 130 may be implemented as various forms of displays such as a liquid crystal display (LCD), an organic light emitting diodes (OLED) display, a plasma display panel (PDP), etc. In the display 130, a driving circuit that may be implemented in forms such as an a-si TFT, a low temperature poly silicon (LTPS) TFT, an organic TFT (OTFT), etc., a backlight unit, and the like may also be included. Meanwhile, the display 130 may also be implemented as a touch screen combined with a touch sensor, a flexible display, a three dimensional (3D) display, and the like.

Also, the display 130 according to an embodiment of the disclosure may not only include a display panel outputting an image, but a bezel housing a display panel. In particular, a bezel according to an embodiment of the disclosure may include a touch sensor (not shown) for sensing a user interaction.

A communication interface 140 is a component that performs communication with various types of external apparatuses according to various types of communication methods. The communication interface 140 includes a Wi-Fi module 141, a Bluetooth module 142, an infrared communication model 143, a wireless communication module 144, etc. Here, each module may be implemented in the form of at least one hardware chip.

The processor 120 may perform communication with various types of external apparatuses by using the communication interface 140. Here, external apparatuses may include another display apparatus like a TV, an image processing apparatus like a set-top box, an external server, a control apparatus like a remote controller, an audio outputting apparatus like a Bluetooth speaker, an illumination apparatus, home electric appliances like a smart cleaner and a smart refrigerator, a server like an IOT home manager, etc.

The Wi-Fi module 141 and the Bluetooth module 142 perform communication in a Wi-Fi method and a Bluetooth method, respectively. In the case of using the Wi-Fi module 141 or the Bluetooth module 142, various types of connection information such as an SSID or a session key is transmitted and received first, and connection of communication is performed by using the information, and various types of information can be transmitted and received thereafter.

The infrared communication module 143 performs communication according to an infrared Data Association (IrDA) technology of transmitting data wirelessly within a short distance by using infrared rays located between visual rays and millimeter waves.

The wireless communication module 144 may include at least one communication chip that performs communication according to various wireless communication standards such as zigbee, 3rd Generation (3G), 3rd Generation Partnership Project (3GPP), Long Term Evolution (LTE), LTE Advanced (LTE-A), 4th Generation (4G), 5th Generation (5G), etc., in addition to the aforementioned communication methods.

In addition, the communication interface 140 may include at least one of a local area network (LAN) module, an Ethernet module, or a wired communication module that performs communication by using a pair cable, a coaxial cable, or an optical fiber cable, and the like.

According to an embodiment of the disclosure, the communication interface 140 may use the same communication module (e.g., a Wi-Fi module) for communicating with an external apparatus like a remote controller and an external server.

According to another embodiment of the disclosure, the communication interface 140 may use a different communication module (e.g., a Wi-Fi module) for communicating with an external apparatus like a remote controller and an external server. For example, the communication interface 140 may use at least one of an Ethernet module or a Wi-Fi module for communicating with an external server, or use a BT module for communicating with an external apparatus like a remote controller. However, this is merely an example, and the communication interface 140 may use at least one communication module among various communication modules when it communicates with a plurality of external apparatuses or external servers.

The user interface 150 may be implemented as an apparatus like a button, a touch pad, a mouse, and a keyboard, or it may also be implemented as a touch screen that is capable of performing a function of inputting operations as well as the aforementioned display function. Here, a button may be various types of buttons such as a mechanical button, a touch pad, a wheel, etc. formed in any area of the exterior of the main body of the electronic apparatus 100 such as the front surface part, the side surface part, and the rear surface part.

The input/output interface 160 may be an interface of any one of a high definition multimedia interface (HDMI), a mobile high-definition link (MHL), a universal serial bus (USB), a display port (DP), a thunderbolt, a video graphics array (VGA) port, a RGB port, a D-subminiature (D-SUB), or a digital visual interface (DVI).

The input/output interface 160 may input and output at least one of an audio signal or a video signal.

According to an embodiment of the disclosure, the input/output interface 160 may include a port that inputs and outputs only audio signals and a port that inputs and outputs only video signals as separate ports, or may be implemented as a port that inputs and outputs both audio signals and video signals.

The speaker 170 may be a component that outputs not only various types of audio data processed at the input/output interface 160 but also various types of notification sound or voice messages, etc.

The microphone 180 is a component for receiving input of a user's voice or other types of sound, and converting the voice or sound into audio data.

The microphone 180 may receive a user's voice in an activated state. For example, the microphone 180 may be formed as an integrated type which is integrated with the upper side or the front surface direction, the side surface direction, etc. of the electronic apparatus 100. Also, the microphone 180 may include various components such as a microphone collecting a user's voice in an analog form, an amplifier circuit that amplifies the collected user's voice, an A/D conversion circuit that samples the amplified user's voice and converts the voice to a digital signal, a filter circuit that removes noise components from the converted digital signal, etc.

As described above, the electronic apparatus 100 may compress a matrix included in an artificial intelligence model, and thereby reduce the data capacity of the entire artificial intelligence model.

Hereinafter, the operation of the electronic apparatus 100 will be described in more detail with reference to drawings.

FIGS. 3A to 3D are diagrams for illustrating a method of processing a matrix included in an artificial intelligence model for promoting understanding of the disclosure.

Figure 3A:
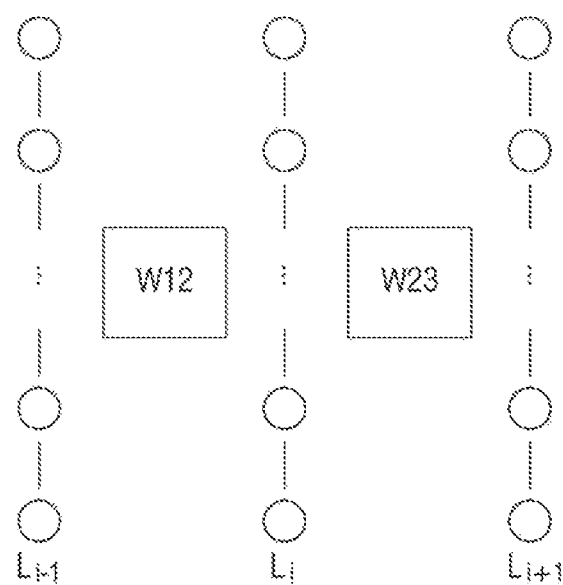
FIG. 3A is a diagram for illustrating a method of processing a matrix included in an artificial intelligence model for promoting understanding of the disclosure.

FIG. 3A is a diagram illustrating an example of an artificial intelligence model including two matrices. The processor 120 may acquire feature map data of Li by inputting the input values of Li−1 to W12, and acquire the final data of Li+1 by inputting the feature map data of Li to W23. However, FIG. 3A illustrates an artificial intelligence model in a very schematic way, and in actuality, more matrices may be included in an artificial intelligence model than in FIG. 3A.

FIG. 3B is a diagram illustrating an example of a first matrix included in an artificial intelligence model, and the first matrix may be in the form of a m×n size. For example, the matrix may be in the form of a 10000×8000 size. Also, each of a plurality of first elements in the first matrix may be 32 bits. That is, the first matrix may include 10000×8000 first elements which are 32 bits, respectively. However, the disclosure is not limited thereto, and the size of the first matrix and the number of bits of each first element may vary in numerous ways.

As illustrated in FIGS. 3A and 3B, considering the size of each of the plurality of first elements included in the first matrix, the number of the plurality of first elements included in the first matrix, and the number of matrices included in an artificial intelligence model, it follows that a substantially large storage space is needed for storing an artificial intelligence model, and a substantial amount of power may be consumed for operations by an artificial intelligence model. Accordingly, the processor 120 may reduce a storage space by pruning and quantizing a matrix, and decrease the amount of operations.

Figure 3C:
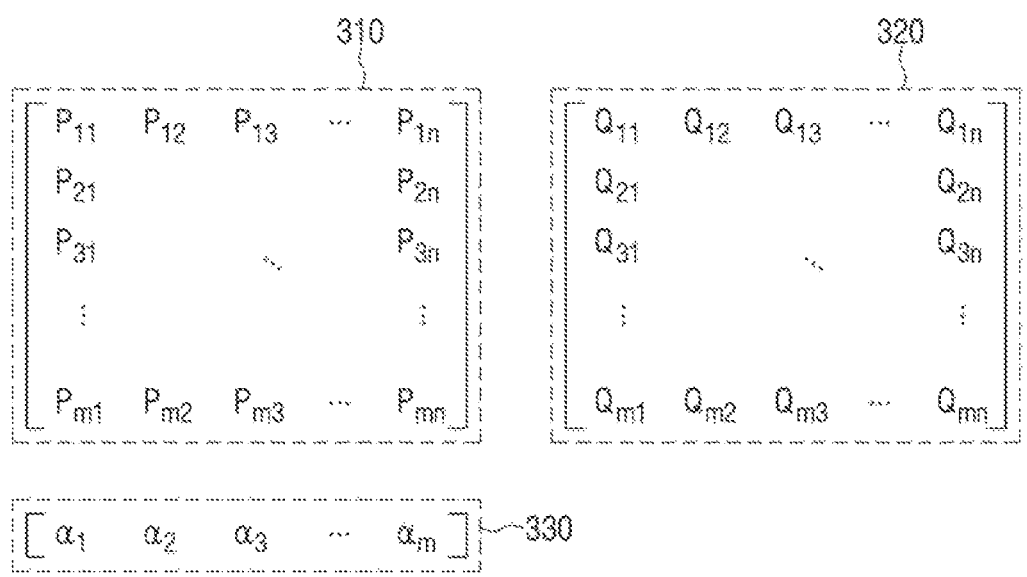
FIG. 3C is a diagram for illustrating a method of processing a matrix included in an artificial intelligence model for promoting understanding of the disclosure.

FIG. 3C is a diagram illustrating a result of pruning and quantizing the first matrix illustrated in FIG. 3B.

The processor 120 may acquire a first pruning index matrix 310 that prunes each of the plurality of first elements included in the first matrix based on a first threshold, and indicates whether each of the plurality of first elements has been pruned with binary data.

For example, the processor 120 may prune the first matrix by a method of converting first elements which are smaller than 30 among the plurality of first elements included in the first matrix to 0, and maintaining the remaining first elements as they are. Then, the processor 120 may acquire a first pruning index matrix 310 by converting first elements converted to 0 among the plurality of first elements as 0, and the remaining first elements as 1. That is, the size of the first pruning index matrix 310 is identical to that of the first matrix, and may include 0 or 1.

Further, the processor 120 may ternary quantize each of the plurality of first elements, and thereby acquire a quantization matrix 320 including a representative value matrix 330 and binary data. In some embodiments, the quantization matrix 320 is associated with the representative value matrix 330.

For the convenience of explanation, a method of ternary quantizing [a, b] will be described. Here, a and b may be 32 bits, respectively. The processor 120 may ternary quantize [a, b], and acquire a representative value c and a quantization matrix [d, e]. Here, the representative value c is 32 bits, and d and e are 1 bit, respectively. That is, the processor 120 may compress 64 bits in total of [a, b] to 32+1+1=34 bits in total of the representative value c and the quantization matrix [d, e] through ternary quantization.

In order to describe a method of acquiring a representative value in a ternary quantization method, [a, b] will be assumed as [3, −1] as an example. The processor 120 may set 2 which is the average of the sizes of 3 and −1 as a representative value. Then, the processor 120 may acquire a quantization matrix [1, 0] which corresponds to each of 3 and −1. In general, a value of "1" in the quantization matrix 320 can correspond to a positive sign ("+"), and a "0" in the quantization matrix 320 can correspond to a negative sign ("−"), as in the example of [1, 0] corresponding to [3, −1]. In this case, 3 will be quantized to 2, and −1 will be quantized to −2, and for each of them, a quantization error as much as 1 will occur. A corresponding pruning index matrix is [1, 1] (none of the elements of [a b] have been pruned).

The processor 120 may ternary quantize elements in an n number by using one representative value in the first matrix illustrated in FIG. 3B. Accordingly, in FIG. 3C, a representative value matrix 330 including elements in an m number is illustrated. Also, the processor 120 may acquire a quantization matrix 320 including binary data. The size of the quantization matrix 320 is identical to the size of the first matrix, and the matrix may include 0 or 1.

However, the aforementioned example is just one example of ternary quantization, and the processor 120 may ternary quantize elements in a different number, but not in an n number, by using one representative value in the first matrix illustrated in FIG. 3B. In this case, the number of elements included in the representative value matrix 330 may not be m.

Also, the processor 120 may acquire a quantization matrix wherein each element consists of a plurality of bits. This is according to a ternary quantization method, and a detailed description thereof will be omitted as it is a conventional technology.

Figure 3D:
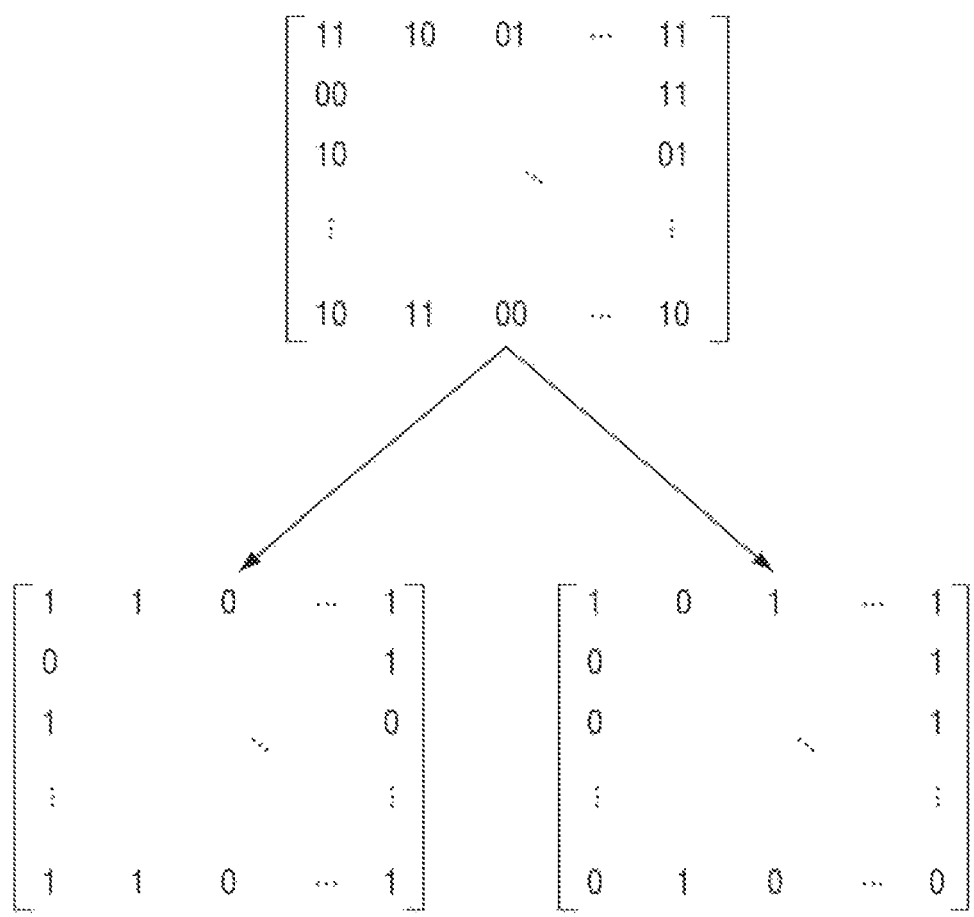
FIG. 3D is a diagram for illustrating a method of processing a matrix included in an artificial intelligence model for promoting understanding of the disclosure.

For example, the processor 120 may acquire a quantization matrix wherein each element is 2 bits, as illustrated in the upper part of FIG. 3D. In this case, the processor 120 may acquire two sub quantization matrices according to the digits of bits, as illustrated in the lower part of FIG. 3D.

The method of compressing a quantization matrix that will be described later is based on the assumption that each element in the quantization matrix is 1 bit. However, even when each element in a quantization matrix consists of a plurality of bits, the processor 120 may divide the quantization matrix into a plurality of sub quantization matrices according to the digits, as illustrated in FIG. 3D, and compress each of the plurality of sub quantization matrices. Accordingly, hereinafter, only a case where each element included in a quantization matrix consists of 1 bit will be described.

The processor 120 may perform additional compression of the first pruning index matrix 310 and the quantization matrix 320 illustrated in FIG. 3C, and this will be described through drawings below.

Figure 4A:
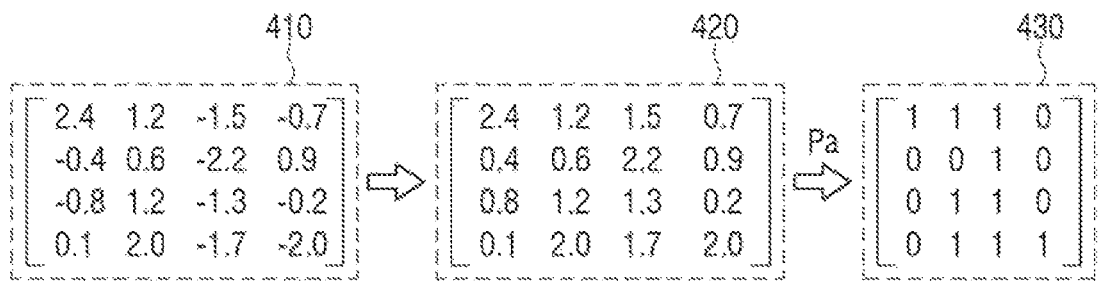
FIG. 4A is a diagram for illustrating a method of compressing a first pruning index matrix according to an embodiment of the disclosure.
Figure 4B:
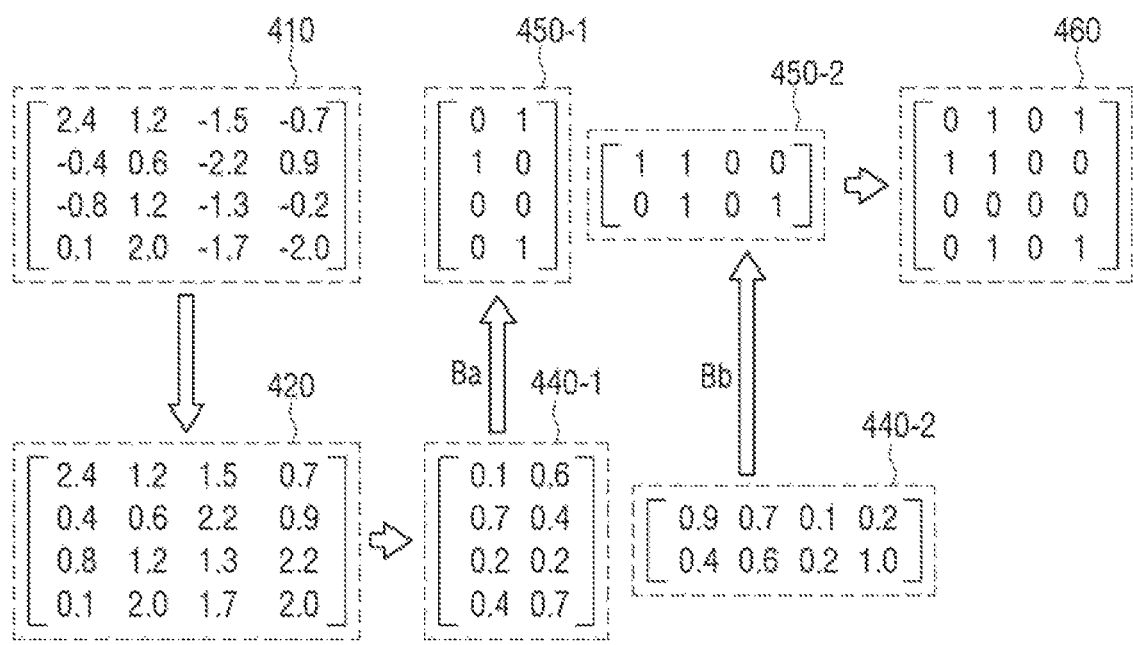
FIG. 4B is a diagram for illustrating a method of compressing a first pruning index matrix according to an embodiment of the disclosure.

FIGS. 4A to 4C are diagrams for illustrating a method of compressing a first pruning index matrix 310 according to an embodiment of the disclosure.

The processor 120 may acquire a matrix 420 including the absolute values of each of the plurality of first elements included in the first matrix 410, as illustrated in FIG. 4A. Also, the processor 120 may acquire a first pruning index matrix 430 by converting elements which are smaller than a first threshold Pa among the plurality of elements included in the matrix 420 to 0, and converting elements which are equal to or greater than the first threshold Pa to 1. That is, the first pruning index matrix 430 is a matrix that was pruned by reflecting the sizes of the plurality of first elements included in the first matrix 420.

Here, the first threshold Pa may be determined based on the required accuracy. For example, if the accuracy of an artificial intelligence model after pruning according to the first threshold Pa becomes noticeably lower than the accuracy of the artificial intelligence model before pruning, the first threshold Pa may be lowered a little bit. Alternatively, if the accuracy of an artificial intelligence model after pruning according to the first threshold Pa is not so different from the accuracy of the artificial intelligence model before pruning, the first threshold may be raised a little bit.

Then, the processor 120 may factorize the first matrix 410 to a second matrix 440-1 having a size of 4 which is the number of the rows of the first matrix 410 and rank 2, and a third matrix 440-2 having a size of rank 2 as well as a number of columns being 4, matching the number of columns of the first matrix 410, as illustrated in FIG. 4B. Here, the processor 120 may acquire the second matrix 440-1 and the third matrix 440-2 by performing non-negative matrix factorization (NMF) on a matrix 420 including the absolute values of each of the plurality of first elements included in the first matrix 410. However, even if the second matrix 440-1 and the third matrix 440-2 are multiplied, the matrix 420 may not be restored. That is, multiplication of the second matrix 440-1 and the third matrix 440-2 may be different from the matrix 420.

Further, the processor 120 may acquire a second pruning index matrix 450-1 that prunes each of a plurality of second elements included in the second matrix 440-1 based on a second threshold Ba, and indicates whether each of the plurality of second elements has been pruned with binary data. Also, the processor 120 may acquire a third pruning index matrix 450-2 that prunes each of a plurality of third elements included in the third matrix 440-2 based on a third threshold Bb, and indicates whether each of the plurality of third elements has been pruned with binary data. The initial second threshold Ba and third threshold Bb may be set as any number.

Meanwhile, the second pruning index matrix 450-1 has been pruned by reflecting the sizes of the plurality of second elements included in the second matrix 440-1, and the third pruning index matrix 450-2 has been pruned by reflecting the sizes of the plurality of third elements included in the third matrix 440-2. That is, the second pruning index matrix 450-1 and the third pruning index matrix 450-2 have not been pruned by reflecting the sizes of the plurality of first elements included in the first matrix 420. Accordingly, a final index matrix 460 which is a result of multiplication of the second pruning index matrix 450-1 and the third pruning index matrix 450-2 may be different from the first pruning index matrix 430 illustrated in FIG. 4A. Here, in the process of matrix multiplication of the second pruning index matrix 450-1 and the third pruning index matrix 450-2, an addition operation may be performed as a XOR operation. That is, the processor 120 performs an addition operation as 1+1=0, and the other operations are identical to the matrix operation.

The processor 120 may compare each of the binary data included in the final index matrix 460 with binary data in corresponding positions included in the first pruning index matrix 430 and identify positions including different data. Then, the processor 120 may sum the sizes of the elements of the first matrix 410 corresponding to the identified positions, and if the summed size is equal to or greater than a threshold size, change at least one of the second threshold Ba or the third threshold Bb, as illustrated in FIG. 4C. That is, the processor 120 may determine that the error of the final index matrix 460 is bigger as the sizes of the elements of the first matrix 410 corresponding to the identified positions are bigger, and change at least one of the second threshold Ba or the third threshold Bb.

Further, the processor 120 may reacquire the second pruning index matrix 450-1 and the third pruning index matrix 450-2 from each of the second matrix 440-1 and the third matrix 440-2. The processor 120 may reacquire the final index matrix 460 based on the reacquired second pruning index matrix 450-1 and third pruning index matrix 450-2, and compare the final index matrix 460 and the first pruning index matrix 430 again.

The processor 120 may repeat a process as described above until the sum of the sizes of the elements of the first matrix 410 corresponding to the identified positions becomes smaller than a threshold size. When the sum of the sizes of the elements of the first matrix 410 corresponding to the identified positions becomes smaller than a threshold size, the processor 120 may store the finally acquired second pruning index matrix 450-1 and third pruning index matrix 450-2 in the memory 110, instead of the first pruning index matrix 430.

In FIGS. 4A to 4C, a compression method was described with a first matrix 410 in a 4×4 size for the convenience of explanation. However, in actuality, the size of the first matrix 410 may be substantially large. For example, if the first matrix 410 is in a m×n size, the first pruning index matrix 430 gets to have m×n elements. In contrast, the second pruning index matrix 450-1 gets to have m×r elements, and the third pruning index matrix 450-2 gets to have r×n elements, and here, r is smaller than m and n.

Accordingly, if the second pruning index matrix 450-1 and the third pruning index matrix 450-2 are used instead of the first pruning index matrix 430, the elements in an amount of m×n in total may be expressed as elements in an amount of (m+n)×r. For example, if m is 1000, n is 100, and r is 30, elements in an amount of 1000×100=100000 may be expressed as elements in an amount of (1000+100)×30=33000, and data capacity may be reduced. Also, as a process of reacquiring the second pruning index matrix 450-1 instead of the first pruning index matrix 430 as described above is repeated, accuracy can be maintained.

FIG. 5 is a diagram for illustrating compression performance and accuracy according to an embodiment of the disclosure.

Song Han's Pruning which is a conventional technology indicates accuracy before compression in FIGS. 4A to 4C, and 20K to 60K indicate the number of times of repeating the reacquisition process. It follows that, as the number of times of repetition becomes greater, accuracy becomes closer to accuracy before compression.

Also, it follows that, as the rank is lowered from 256 to 4, the compression rate is improved from 1.2 to 76.9.

Figure 6B:
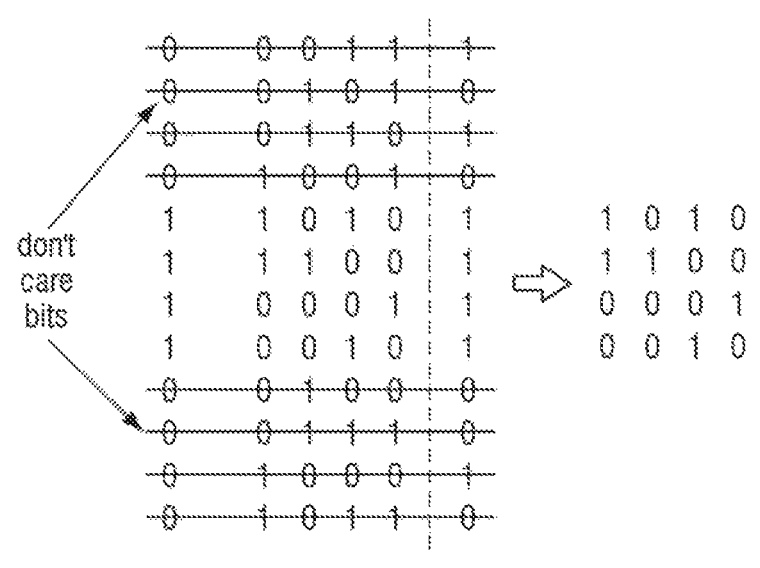

FIGS. 6A to 6B are diagrams for illustrating a method of compressing a quantization matrix 320 according to an embodiment of the disclosure.

The processor 120 may acquire a random matrix of which size was determined based on a compression subject unit and a compression target unit of the binary data included in the quantization matrix 320.

For example, if the compression subject unit is set as 9, and the compression target unit is set as 5, the processor 120 may acquire a random matrix A in a 9×5 size, as illustrated in FIG. 6A. The random matrix A may include 0 or 1. That is, the processor 120 may compress the binary data included in the quantization matrix 320 in units of 9.

Then, the processor 120 may acquire a compression target unit x such that multiplication of unknowns included in the random matrix A and the compression target unit x becomes a plurality of binary data included in a compression subject unit B. This may be expressed in the form of matrix multiplication as A×x=B, as in FIG. 6A. Here, x among the plurality of binary data included in the compression subject unit B indicates 'don't care,' and a description in this regard will be made later.

The processor 120 may acquire a plurality of equations based on the plurality of binary data included in the random matrix A and the compression subject unit B. That is, according to an example as in FIG. 6A, nine equations may be acquired, and here, the number of the unknowns may be five of the compression target unit x.

Also, the processor 120 may remove at least some of the plurality of equations based on binary data corresponding to the pruned first element among a plurality of binary data corresponding to the compression subject unit B, and acquire binary data corresponding to the compression target unit x based on the remaining equations.

For example, the processor 120 may remove at least some of the plurality of equations by a method of deleting data corresponding to 'don't care,' as illustrated in FIG. 6B. Meanwhile, 'don't care' may be determined based on the pruned first element. As described above, the quantization matrix 320 is acquired from the first matrix, and thus it may be irrelevant to pruning. However, according to pruning, some of the data of the quantization matrix 320 may not be used at all, and such data becomes don't care data. Also, as there would be no problem if don't care data is restored to a different value after compression, it is okay to delete an equation corresponding to 'don't care' among the plurality of equations.

Here, the first column from the leftmost side of FIG. 6B indicates whether the first element corresponding to the binary data of the compression subject unit B has been pruned, and the four columns in the middle portion is a random matrix, and the fifth column is the binary data of the compression subject unit B. For the convenience of explanation, the example in FIG. 6b was illustrated differently from the example in FIG. 6A.

The processor 120 may acquire values for the four unknowns of the compression target unit x by using the remaining four equations, as illustrated in FIG. 6B. Here, the processor 120 may acquire values for the four unknowns of the compression target unit x through a method like Gaussian elimination. As this is a conventional technology, a detailed description in this regard will be omitted. However, the method is not limited thereto, and the processor 120 may acquire values for unknowns by various other methods.

When values for unknowns are acquired in FIG. 6B, nine binary data may be compressed to four. That is, the quantization matrix 320 in a m×n size is compressed to the matrix in a m×n×5/9 size. Therefore, the artificial intelligence model can be used on devices with a small memory, such as smartphone.

The processor 120 may restore binary data before compression by multiplying values for the random matrix and the unknowns. Meanwhile, some of the restored data may be different from the data before compression, but this is data corresponding to 'don't care,' and does not influence the accuracy of operations of an artificial intelligence algorithm.

Figure 7A:
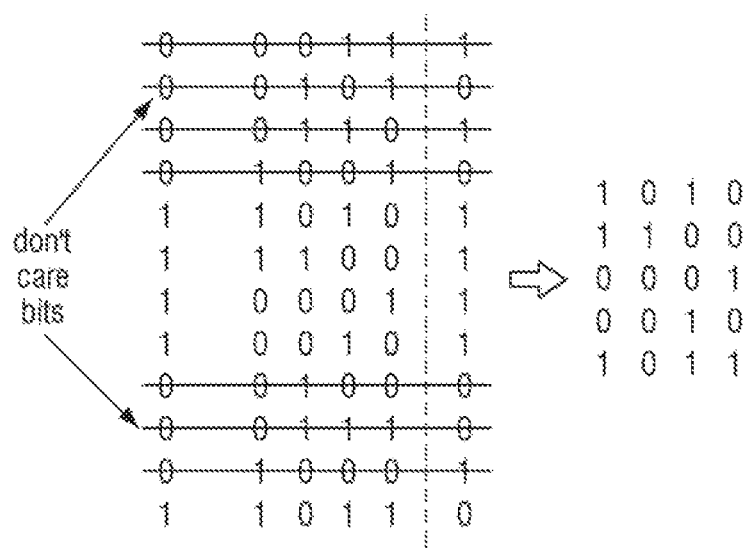
FIG. 7A is a diagram for illustrating a method of compressing a quantization matrix according to another embodiment of the disclosure.
Figure 7B:
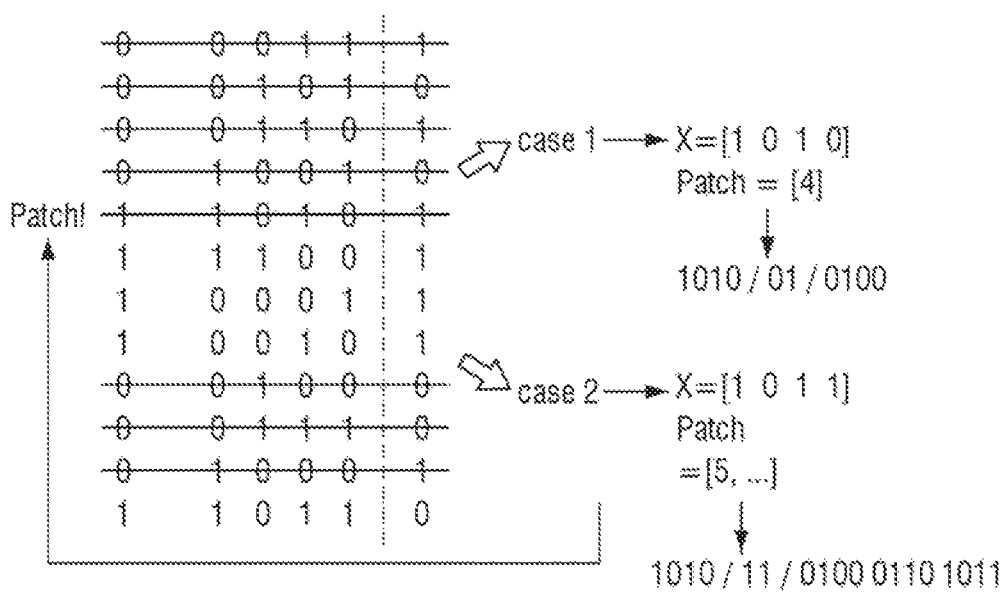
FIG. 7B is a diagram for illustrating a method of compressing a quantization matrix according to another embodiment of the disclosure.

FIGS. 7A to 7B are diagrams for illustrating a method of compressing a quantization matrix 320 according to another embodiment of the disclosure.

If the number of the remaining equations exceeds the number of unknowns included in the compression target unit, the processor 120 may identify a plurality of first equations corresponding to the number of unknowns among the remaining equations based on dependency among the remaining equations, and acquire binary data corresponding to the compression target unit based on the plurality of first equations.

For example, as illustrated in FIG. 7A, if the number of the remaining equations is five, and the number of the unknowns included in the compression target unit is four, the processor 120 may identify four first equations among the remaining equations based on dependency among the remaining equations, and acquire binary data (values for the unknowns) corresponding to the compression target unit based on the four first equations.

Then, the processor 120 may identify whether at least one second equation excluding the plurality of first equations among the remaining equations is established based on the acquired binary data corresponding to the compression target unit, and generate patch information corresponding to third equations that are not established among the at least one second equation. Here, the patch information may include information on the number of the third equations that are not established and identification information of each of the third equations that are not established.

For example, in case a value for an unknown corresponding to the compression target unit is acquired by using data (1 0 1 0; 1 1 0 0; 0 0 0 1; 0 0 1 0) until the fourth row among the remaining data excluding 'don't care' in FIG. 7A, the processor 120 may apply the acquired value for the unknown to an equation including data (1 0 1 1) of the fifth row among the remaining data, and identify whether the equation is established.

If the equation is established, the processor 120 does not need to perform an additional operation. This is because binary data corresponding to the compression subject unit excluding 'don't care' is restored by using the acquired value for the unknown and the random matrix.

In contrast, if the equation is not established, the processor 120 may generate patch information as in FIG. 7B. First, as in case 1, in case there are five remaining equations, and a value for an unknown is acquired by using four equations among the equations, and then the value for the unknown is applied to an equation based on the data (1 0 1 0) of the first row, but the equation is not established, the processor 120 may need a patch, and generate position information of the equation for which patch should be performed as patch information. That is, the processor 120 may ultimately acquire 1010 (compressed data)/01 (the number of patches)/ 0100 (the position to be patched).

Alternatively, as in case 2, in case there are five remaining equations, and four equations among the equations are used, a value for an unknown may not be acquired. In this case, the processor 120 may acquire a value for an unknown for which as many equations as possible are established. In FIG. 7B, a case where the processor 120 acquires a value for an unknown for which two equations are established is assumed. When a value for an unknown is acquired, the processor 120 may need three patches, and generate position information of three equations for which patch should be performed as patch information. That is, the processor 120 may ultimately acquire 1010 (compressed data)/11 (the number of patches)/0100 0110 1011 (the positions to be patched).

The processor 120 may restore binary data before compression by multiplying values for the random matrix and the unknown. Then, the processor 120 may patch some of the restored data based on the positions to be patched included in the patch information. The processor 120 may perform patching by converting 0 to 1, and 1 to 0. Meanwhile, some of the restored data may be different from the data before compression. However, this is data corresponding to 'don't care,' and it does not influence the accuracy of operations by an artificial intelligence algorithm.

Meanwhile, if a random matrix is acquired, constitution of a circuit becomes possible by using a XOR gate, and thus implementation may be made easy.

Figure 8:
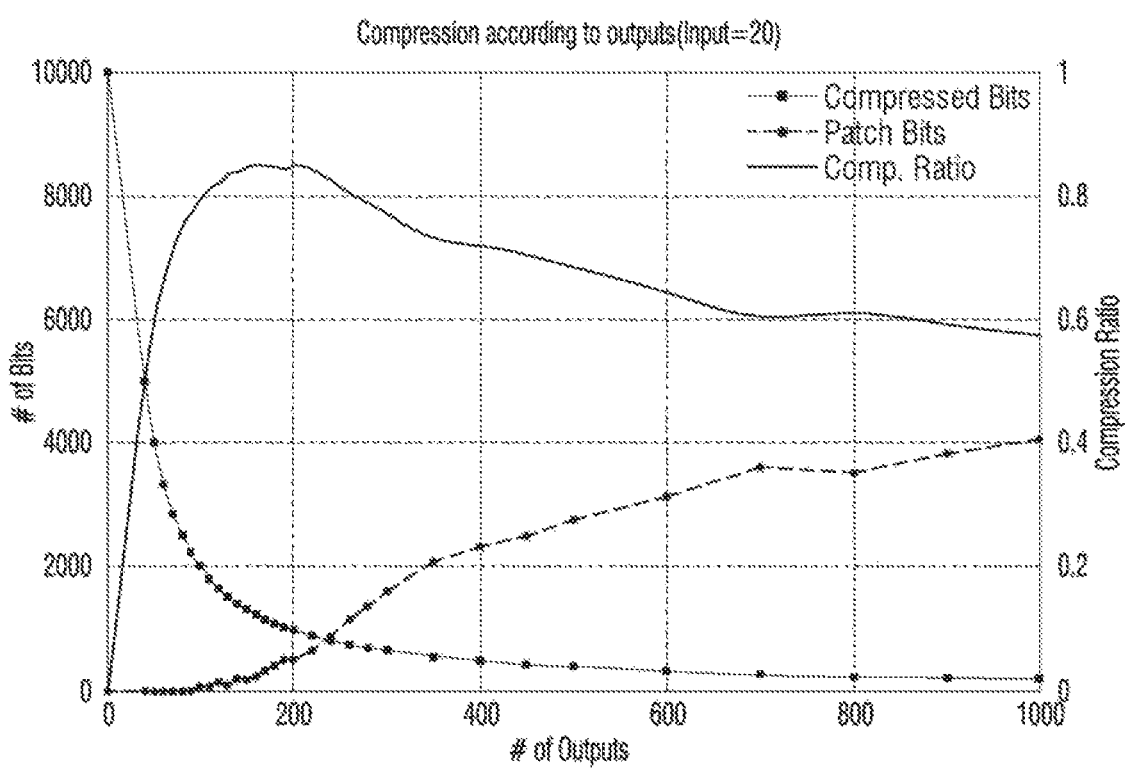
FIG. 8 is a diagram for illustrating a method for acquiring an optimal condition for compression according to an embodiment of the disclosure.

FIG. 8 is a diagram for illustrating a method for acquiring an optimal condition for compression according to an embodiment of the disclosure.

In FIG. 8, the number of the compression target units is assumed as 20, and the x axis indicates the number of the compression subject units, and the y axis indicates the number of bits according to compression of sample data before compression. That is, sample data before compression has 10000 bits in total, and if the number of the compression subject units is set as 100, the number of bits according to compression becomes approximately 2000 bits. If the number of the compression subject units is increased, the number of bits according to compression is decreased.

In contrast, if the number of the compression subject units is increased, it is difficult for an equation to be established. Thus, bits according to patch information may be added.

Meanwhile, a compression rate is determined as the sum of the number of bits according to compression and the number of bits according to patch information, and a case of maintaining the number of compression subject units as approximately 200 may be an optimal condition for compression.

Figure 9:
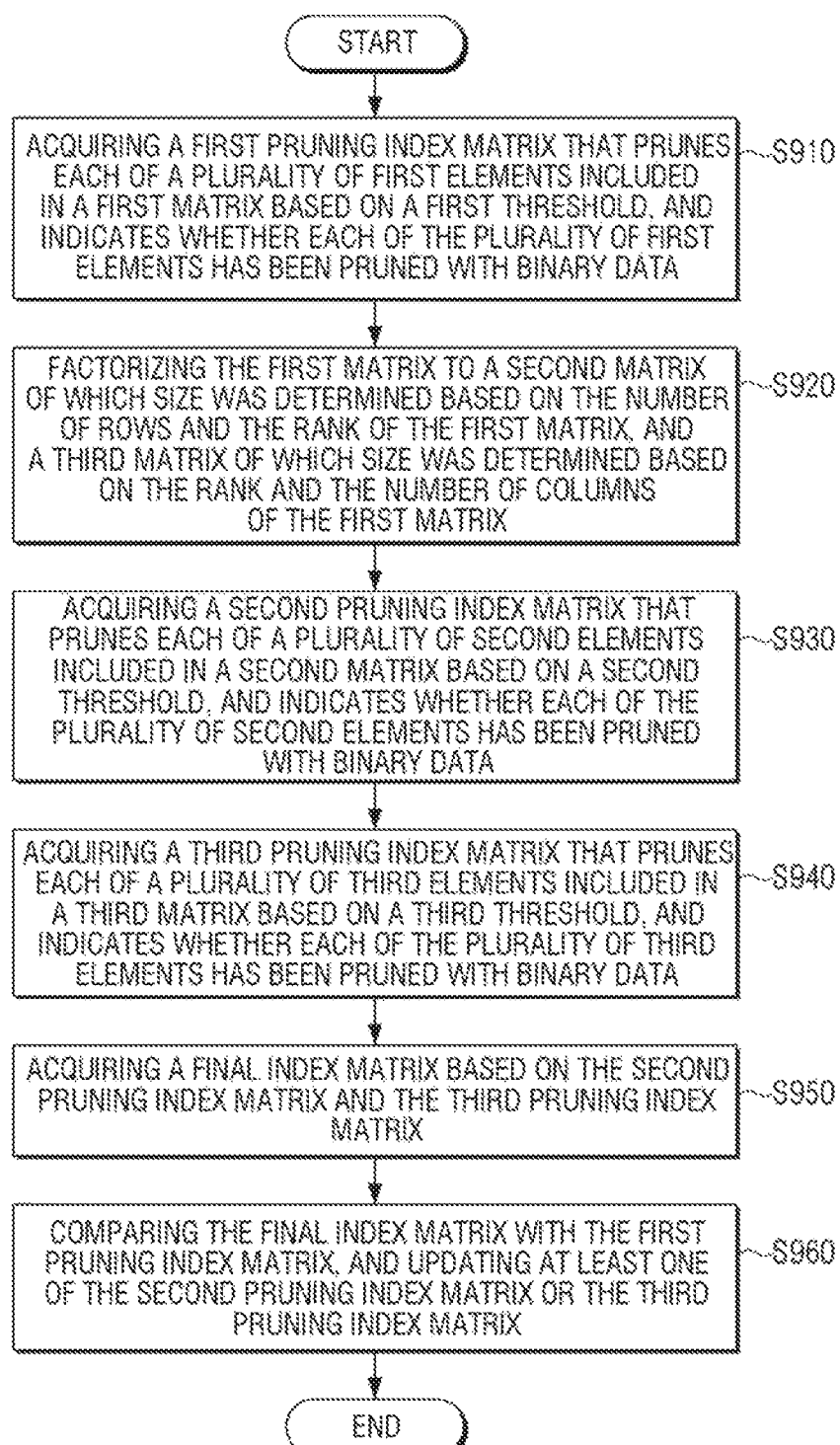
FIG. 9 is a flow chart for illustrating a control method of an electronic apparatus according to an embodiment of the disclosure.

FIG. 9 is a flow chart for illustrating a control method of an electronic apparatus according to an embodiment of the disclosure.

In a control method of an electronic apparatus storing a first matrix included in an artificial intelligence model trained based on sample data, first, a first pruning index matrix that prunes each of a plurality of first elements included in the first matrix based on a first threshold, and indicates whether each of the plurality of first elements has been pruned with binary data is acquired at operation S910.

Then, the first matrix is factorized to a second matrix of which size was determined based on the number of rows and the rank, and a third matrix of which size was determined based on the rank and the number of columns of the first matrix at operation S920. Then, a second pruning index matrix that prunes each of a plurality of second elements included in the second matrix based on a second threshold, and indicates whether each of the plurality of second elements has been pruned with binary data is acquired at operation S930. Then, a third pruning index matrix that prunes each of a plurality of third elements included in the third matrix based on a third threshold, and indicates whether each of the plurality of third elements has been pruned with binary data is acquired at operation S940. Then, a final index matrix is acquired based on the second pruning index matrix and the third pruning index matrix at operation S950. Lastly, the final index matrix is compared with the first pruning index matrix, and at least one of the second pruning index matrix or the third pruning index matrix is updated at operation S960.

Here, the updating step S960 may include the steps of comparing each of the binary data included in the final index matrix with binary data in corresponding positions included in the first pruning index matrix and identifying positions including different data, and changing at least one of the second threshold or the third threshold based on the size of an element of the first matrix corresponding to the identified position, and updating at least one of the second pruning index matrix or the third pruning index matrix.

Also, the step of updating at least one of the second pruning index matrix or the third pruning index matrix may include the steps of, based on identifying a plurality of positions having different data, summing the sizes of a plurality of elements of the first matrix corresponding to the plurality of identified positions, and based on the summed size being equal to or greater than a threshold size, changing at least one of the second threshold or the third threshold.

In addition, in the step of updating at least one of the second pruning index matrix or the third pruning index matrix, if one of the second threshold or the third threshold is increased, the other one of the second threshold or the third threshold may be decreased, and if one of the second threshold or the third threshold is decreased, the other one of the second threshold or the third threshold may be increased.

Meanwhile, a control method of an electronic apparatus may further include the steps of ternary quantizing each of the plurality of first elements and acquiring a quantization matrix including a representative value matrix and binary data, acquiring a random matrix of which size was determined based on a compression subject unit and a compression target unit of the binary data included in the quantization matrix, acquiring a plurality of equations based on the random matrix and the compression subject unit and removing at least some of the plurality of equations based on binary data corresponding to the pruned first element among a plurality of binary data corresponding to the compression subject unit, and acquiring binary data corresponding to the compression target unit based on the remaining equations.

Here, the step of acquiring binary data corresponding to the compression target unit may include the steps of, based on the number of the remaining equations exceeding the number of unknowns included in the compression target unit, identifying a plurality of first equations corresponding to the number of unknowns among the remaining equations based on dependency among the remaining equations, and acquiring binary data corresponding to the compression target unit based on the plurality of first equations.

Also, the step of acquiring binary data corresponding to the compression target unit may further include the steps of identifying whether at least one second equation excluding the plurality of first equations among the remaining equations is established based on the acquired binary data corresponding to the compression target unit, and generating patch information corresponding to third equations that are not established among the at least one second equation. The patch information may include information on the number of the third equations that are not established and identification information of each of the third equations that are not established.

Meanwhile, in the step of acquiring a quantization matrix, each of a plurality of first elements that were not pruned in the first matrix may be ternary quantized, and a quantization matrix including a representative value matrix and binary data may be acquired.

Here, in the step of acquiring a quantization matrix, a plurality of first elements that were not pruned in the first matrix may be identified based on the final index matrix.

Meanwhile, a random matrix may include elements of a first type and elements of a second type, and the number of the elements of the first type included in the random matrix and the number of the elements of the second type included in the random matrix may be identical to each other.

According to the various embodiments of the disclosure as described above, an electronic apparatus is capable of overcoming constraints according to hardware performance by compressing an artificial intelligence model so that parallel computer processing is possible, and improving the processing rate.

Meanwhile, according to an embodiment of the disclosure, the various embodiments described above may be implemented as software including instructions stored in machine-readable storage media, which can be read by machines (e.g., computers). The machines refer to apparatuses that call instructions stored in a storage medium, and can operate according to the called instructions, and the apparatuses may include an electronic apparatus according to the aforementioned embodiments (e.g., an electronic apparatus A). In case an instruction is executed by a processor, the processor may perform a function corresponding to the instruction by itself, or by using other components under its control. An instruction may include a code that is generated or executed by a compiler or an interpreter. A storage medium that is readable by machines may be provided in the form of a non-transitory storage medium. Here, the term 'non-transitory' only means that a storage medium does not include signals, and is tangible, but does not indicate whether data is stored in the storage medium semi-permanently or temporarily.

Also, according to an embodiment of the disclosure, the method according to the various embodiments described above may be provided while being included in a computer program product. A computer program product refers to a product, and it can be traded between a seller and a buyer. A computer program product can be distributed on-line in the form of a storage medium that is readable by machines (e.g. compact disc read only memory (CD-ROM)), or through an application store (e.g. Play Store™). In the case of on-line distribution, at least a portion of a computer program product may be stored in a storage medium such as the server of the manufacturer, the server of the application store, or the memory of the relay server at least temporarily, or may be generated temporarily.

In addition, according to an embodiment of the disclosure, the various embodiments described above may be implemented in a recording medium that can be read by a computer or an apparatus similar to a computer, by using software, hardware, or a combination thereof. In some cases, the embodiments described in this specification may be implemented by a processor itself. According to implementation by software, the embodiments such as processes and functions described in this specification may be implemented by separate software modules. Each of the software modules can perform one or more functions and operations described in this specification.

Meanwhile, computer instructions for performing processing operations of machines according to the aforementioned various embodiments may be stored in a non-transitory computer-readable medium. Computer instructions stored in such a non-transitory computer-readable medium make the processing operations at machines according to the aforementioned various embodiments performed by a specific machine, when the instructions are executed by the processor of the specific machine. A non-transitory computer-readable medium refers to a medium that stores data semi-permanently, and is readable by machines, but not a medium that stores data for a short moment such as a register, a cache, and memory. As specific examples of a non-transitory computer-readable medium, there may be a CD, a DVD, a hard disc, a blue-ray disc, a USB, a memory card, a ROM and the like.

Further, each of the components according to the aforementioned various embodiments (e.g. a module or a program) may consist of a singular object or a plurality of objects. Also, among the aforementioned corresponding sub components, some sub components may be omitted, or other sub components may be further included in the various embodiments. Generally or additionally, some components (e.g. a module or a program) may be integrated as an object, and perform the functions that were performed by each of the components before integration identically or in a similar manner. A module, a program, or operations performed by other components according to the various embodiments may be executed sequentially, in parallel, repetitively, or heuristically. Or, at least some of the operations may be executed or omitted in a different order, or other operations may be added.

While the disclosure has been shown and described with reference to preferred embodiments thereof, the disclosure is not limited to the aforementioned specific embodiments, and it is apparent that various modifications can be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. An electronic apparatus comprising:
a memory configured to store a first matrix, wherein the first matrix is included in an artificial intelligence (AI) model, and wherein the AI model is trained based on sample data; and
a processor configured to:
prune each of a plurality of first elements included in the first matrix based on a first threshold,
acquire a first pruning index matrix, wherein the first pruning index matrix indicates for each element of the plurality of first elements, whether each element of the plurality of first elements has been pruned,
factorize the first matrix to a second matrix and a third matrix, wherein a size of the second matrix is determined based on a number of rows of the first matrix and a rank, wherein a size of the third matrix is determined based on the rank and a number of columns of the first matrix, prune, based on a second threshold, each of a plurality of second elements included in the second matrix, acquire a second pruning index matrix, wherein the second pruning index matrix indicates for each element of the plurality of second elements, whether each element of the plurality of second elements has been pruned, prune, based on a third threshold, each of a plurality of third elements included in the third matrix, acquire a third pruning index matrix, wherein the third pruning index matrix indicates for each element of the plurality of third elements, whether each element of the plurality of third elements has been pruned, acquire a final index matrix based on the second pruning index matrix and the third pruning index matrix, and update at least one of the second pruning index matrix or the third pruning index matrix by comparing the final index matrix with the first pruning index matrix.

2. The electronic apparatus of claim 1,
wherein the processor is further configured to:
compare elements included in the final index matrix with elements in corresponding positions included in the first pruning index matrix,
identify positions at which the elements included in the final index matrix do not match the elements in corresponding positions included in the first pruning index matrix, and
update at least one of the second pruning index matrix or the third pruning index matrix, wherein the processor is configured to perform the update by changing, based on the sizes of elements of the first matrix corresponding to the identified positions, at least one of the second threshold or the third threshold.

3. The electronic apparatus of claim 2,
wherein the processor is further configured to:
based on identifying a plurality of positions at which the elements included in the final index matrix do not match the elements in corresponding positions included in the first pruning index matrix, obtain summed size by summing the sizes of a plurality of elements of the first matrix corresponding to the plurality of identified positions, and
based on the summed size being equal to or greater than a threshold size, change at least one of the second threshold or the third threshold.

4. The electronic apparatus of claim 2,
wherein the processor is further configured to:
based on one of the second threshold or the third threshold being increased, decrease the other one of the second threshold or the third threshold, and
based on one of the second threshold or the third threshold being decreased, increase the other one of the second threshold or the third threshold.

5. The electronic apparatus of claim 1,
wherein the processor is further configured to:
ternary quantize each of the plurality of first elements and acquire a quantization matrix including a representative value matrix and first binary data,
acquire a random matrix, wherein a size of the random matrix is based on a compression subject unit and a compression target unit of the first binary data,
acquire a plurality of equations based on the random matrix and the compression subject unit, and
remove at least some of the plurality of equations based on binary data corresponding to the pruned first element among a plurality of binary data corresponding to the compression subject unit, and acquire second binary data corresponding to the compression target unit based on remaining equations of the plurality of equations.

6. The electronic apparatus of claim 5,
wherein the processor is further configured to:
based on a number of the remaining equations exceeding a number of unknowns included in the compression target unit, identify, among the remaining equations based on dependency among the remaining equations, a plurality of first equations corresponding to the number of unknowns, and
acquire third binary data corresponding to the compression target unit based on the plurality of first equations.

7. The electronic apparatus of claim 6,
wherein the processor is further configured to:
identify whether at least one second equation excluding the plurality of first equations is established based on the third binary data, and
generate patch information corresponding to third equations that are not established, wherein the plurality of equations includes the third equations,
wherein the patch information includes information on a number of the third equations and identification information of each of the third equations that are not established.

8. The electronic apparatus of claim 5,
wherein the processor is further configured to:
acquire the quantization matrix by ternary quantizing each of a plurality of first elements that were not pruned in the first matrix.

9. The electronic apparatus of claim 8,
wherein the processor is further configured to:
identify the plurality of first elements that were not pruned in the first matrix based on the final index matrix.

10. The electronic apparatus of claim 5,
wherein the random matrix includes elements of a first type and elements of a second type, and
a number of the elements of the first type included in the random matrix and a number of the elements of the second type included in the random matrix are identical to each other.

11. A control method of an electronic apparatus storing a first matrix included in an artificial intelligence (AI) model trained based on sample data, the control method comprising:
pruning each of a plurality of first elements included in the first matrix based on a first threshold,
acquiring a first pruning index matrix, wherein the first pruning index matrix indicates for each element of the plurality of first elements, whether each element of the plurality of first elements has been pruned;
factorizing the first matrix to a second matrix and a third matrix, wherein a size of the second matrix is determined based on a number of rows of the first matrix and a rank, wherein a size of the third matrix is determined based on the rank and a number of columns of the first matrix;
pruning, based on a second threshold, each of a plurality of second elements included in the second matrix;
acquiring a second pruning index matrix, wherein the second pruning index matrix indicates for each element of the plurality of second elements, whether each element of the plurality of second elements has been pruned;

pruning, based on a third threshold, each of a plurality of third elements included in the third matrix;

acquiring a third pruning index matrix, wherein the third pruning index matrix indicates for each element of the plurality of third elements, whether each element of the plurality of third elements has been pruned;

acquiring a final index matrix based on the second pruning index matrix and the third pruning index matrix; and updating at least one of the second pruning index matrix or the third pruning index matrix by comparing the final index matrix with the first pruning index matrix.

12. The control method of claim 11,
wherein the updating comprises:
comparing elements included in the final index matrix with elements in corresponding positions included in the first pruning index matrix and identifying positions at which the elements included in the final index matrix do not match the elements in corresponding positions included in the first pruning index matrix; and
updating at least one of the second pruning index matrix or the third pruning index matrix by changing, based on sizes of elements of the first matrix corresponding to the identified positions, at least one of the second threshold or the third threshold.

13. The control method of claim 12,
wherein the updating at least one comprises:
based on identifying a plurality of positions at which the elements included in the final index matrix do not match the elements in corresponding positions included in the first pruning index matrix, obtaining summed size by summing the sizes of a plurality of elements of the first matrix corresponding to the plurality of identified positions; and
based on the summed size being equal to or greater than a threshold size, changing at least one of the second threshold or the third threshold.

14. The control method of claim 12,
wherein the updating at least one comprises:
based on one of the second threshold or the third threshold being increased, decreasing the other one of the second threshold or the third threshold; and
based on one of the second threshold or the third threshold being decreased, increasing the other one of the second threshold or the third threshold.

15. The control method of claim 11, further comprising:
ternary quantizing each of the plurality of first elements and acquiring a quantization matrix including a representative value matrix and first binary data;

acquiring a random matrix, wherein a size of the random matrix is based on a compression subject unit and a compression target unit of the first binary data;

acquiring a plurality of equations based on the random matrix and the compression subject unit;

removing at least some of the plurality of equations based on binary data corresponding to the pruned first element among a plurality of binary data corresponding to the compression subject unit; and acquiring second binary data corresponding to the compression target unit based on remaining equations of the plurality of equations.

16. The control method of claim 15,
wherein the acquiring second binary data corresponding to the compression target unit comprises:
based on a number of the remaining equations exceeding a number of unknowns included in the compression target unit, identifying, among the remaining equations based on dependency among the remaining equations, a plurality of first equations corresponding to the number of unknowns; and
acquiring third binary data corresponding to the compression target unit based on the plurality of first equations.

17. The control method of claim 16,
wherein the acquiring third binary data corresponding to the compression target unit further comprises:
identifying whether at least one second equation excluding the plurality of first equations is established based on the third binary data; and
generating patch information corresponding to third equations that are not established, wherein the plurality of equations includes the third equations,
wherein the patch information includes information on a number of the third equations and identification information of each of the third equations that are not established.

18. The electronic apparatus of claim 15,
wherein the acquiring the quantization matrix comprises:
acquiring the quantization matrix by ternary quantizing each of a plurality of first elements that were not pruned in the first matrix.

19. The electronic apparatus of claim 18,
wherein the acquiring the quantization matrix comprises:
identifying the plurality of first elements that were not pruned in the first matrix based on the final index matrix.

20. The electronic apparatus of claim 15,
wherein the random matrix includes elements of a first type and elements of a second type, and
a number of the elements of the first type included in the random matrix and a number of the elements of the second type included in the random matrix are identical to each other.

* * * * *